(12) United States Patent
Pan

(10) Patent No.: US 11,405,202 B2
(45) Date of Patent: Aug. 2, 2022

(54) KEY PROCESSING METHOD AND APPARATUS

(71) Applicant: Huawei Technologies Co., Ltd., Shenzhen (CN)

(72) Inventor: Shilin Pan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 17/114,052

(22) Filed: Dec. 7, 2020

(65) Prior Publication Data

US 2021/0091945 A1  Mar. 25, 2021

Related U.S. Application Data

(63) Continuation of application No. PCT/CN2018/091282, filed on Jun. 14, 2018.

(51) Int. Cl.
*H04L 9/08* (2006.01)
*G06F 21/60* (2013.01)
*H04L 9/06* (2006.01)

(52) U.S. Cl.
CPC .......... *H04L 9/0897* (2013.01); *G06F 21/602* (2013.01); *H04L 9/0631* (2013.01); *H04L 9/0643* (2013.01); *H04L 9/0877* (2013.01)

(58) Field of Classification Search
CPC ... H04L 9/0897; H04L 9/0631; H04L 9/0643; H04L 9/0877; G06F 21/602
See application file for complete search history.

(56) References Cited

U.S. PATENT DOCUMENTS

| | | | |
|---|---|---|---|
| 5,495,533 A * | 2/1996 | Linehan ................ | H04L 9/0822 713/155 |
| 9,875,368 B1 | 1/2018 | Willden et al. | |
| 10,922,441 B2 * | 2/2021 | Mo ....................... | H04L 9/0822 |
| 2005/0262361 A1 | 11/2005 | Thibadeau | |
| 2006/0232826 A1 * | 10/2006 | Bar-El .................... | G06F 21/85 358/403 |
| 2015/0270956 A1 * | 9/2015 | Basmov ................. | G06F 21/74 713/189 |
| 2017/0005790 A1 | 1/2017 | Brockmann et al. | |

(Continued)

FOREIGN PATENT DOCUMENTS

| | | |
|---|---|---|
| CN | 101539979 A | 9/2009 |
| CN | 104392188 A | 3/2015 |

(Continued)

*Primary Examiner* — Ayoub Alata
(74) *Attorney, Agent, or Firm* — Conley Rose, P.C.

(57) ABSTRACT

A key processing method includes receiving, in a trusted execution environment, an initial key from a file encryption system in a normal execution environment, decrypting, in the trusted execution environment, the initial key to obtain a file key, storing, in the trusted execution environment, the file key in a key register of a storage controller, where the file encryption system in the normal execution environment is forbidden to access the key register, obtaining, in the trusted execution environment, a key index of the file key in the key register, where the key index indicates a storage location of the file key in the key register, and sending, in the trusted execution environment, the key index to the file encryption system.

13 Claims, 14 Drawing Sheets

(56) References Cited

U.S. PATENT DOCUMENTS

| | | |
|---|---|---|
| 2017/0026171 A1 | 1/2017 | Lal et al. |
| 2017/0103378 A1 | 4/2017 | Pan |
| 2017/0185789 A1 | 6/2017 | Khosravi et al. |
| 2017/0331628 A1 | 11/2017 | Adams et al. |
| 2017/0357830 A1 | 12/2017 | Benson et al. |
| 2019/0050844 A1 | 2/2019 | Pan |
| 2019/0172047 A1 | 6/2019 | Tan et al. |
| 2021/0117534 A1* | 4/2021 | Maximov ............. H04L 9/3234 |

FOREIGN PATENT DOCUMENTS

| | | |
|---|---|---|
| CN | 105260663 A | 1/2016 |
| CN | 105812332 A | 7/2016 |
| CN | 104778794 B | 6/2017 |
| CN | 106980794 A | 7/2017 |
| CN | 107743133 A | 2/2018 |
| CN | 107851161 A | 3/2018 |
| CN | 108155986 A | 6/2018 |
| CN | 105912272 B | 3/2019 |
| WO | 2018027587 A1 | 2/2018 |

* cited by examiner

KEY PROCESSING METHOD AND APPARATUS

CROSS-REFERENCE TO RELATED APPLICATIONS

This application is a continuation of International Patent Application No. PCT/CN2018/091282 filed on Jun. 14, 2018, which is hereby incorporated by reference in its entirety.

TECHNICAL FIELD

Embodiments of this application relate to the field of key processing technologies, and in particular, to a key processing method and apparatus.

BACKGROUND

Currently, when a file is written into an intelligent device, the file needs to be encrypted using a file key, and then an encrypted file is stored in a storage, to ensure security of the file on the intelligent device. When reading the file, the intelligent device needs to decrypt the encrypted file in the storage using the file key, to obtain the file. Because security of the file key directly affects security of the file on the intelligent device, security of the file key on the intelligent device is more important. The following briefly describes a method for generating a file key.

A system of the intelligent device mainly includes a normal execution environment and a trusted execution environment. After an intelligent device is started, a module in the trusted execution environment decrypts a ciphertext of a file key to obtain the file key, and sends the file key to a file encryption module in the normal execution environment. Then, the file encryption module in the normal execution environment stores the file key in a memory for subsequent use such that when the intelligent device needs to write a file or the intelligent device needs to read a file, the file encryption module in the normal execution environment may encrypt or decrypt the file using the file key.

A large amount of third-party application software installed by a user runs in the normal execution environment. If a hacker illegally cracks the file encryption module in the normal execution environment through the third-party application software, the hacker may steal the file key in the memory through an interface of the file encryption module, and then decrypt the file on the intelligent device using the file key. Therefore, the technical solution provided in the other approaches cannot ensure security of the file key on the intelligent device.

SUMMARY

Embodiments of this application provide a key processing method and apparatus, to ensure security of a file key on an intelligent device.

The embodiments of this application are implemented as follows.

According to a first aspect, an embodiment of this application provides a key processing method. The method includes receiving, in a trusted execution environment, an initial key sent by a file encryption module in a normal execution environment, decrypting, in the trusted execution environment, the initial key to obtain a file key, where the file key is used to encrypt a file, storing, in the trusted execution environment, the file key in a key register of a storage controller, where the file encryption module in the normal execution environment is forbidden to access the key register, obtaining, in the trusted execution environment, a key index of the file key in the key register, where the key index is used to indicate a storage location of the file key in the key register, and sending, in the trusted execution environment, the key index to the file encryption module in the normal execution environment.

In the first aspect, the file encryption module in the normal execution environment is forbidden to access a module or information in the trusted execution environment. In a process of generating the file key in the trusted execution environment, the file encryption module in the normal execution environment cannot steal the file key generated in the trusted execution environment. Therefore, the process of generating the file key is secure. In addition, after the file key is generated in the trusted execution environment, the file key is stored, in the trusted execution environment, in the key register of the storage controller. Because the file encryption module in the normal execution environment is forbidden to access the key register, the file encryption module in the normal execution environment cannot steal the file key in the key register of the storage controller. Therefore, the storage environment of the file key is also secure. Furthermore, only the key index of the file key is sent in the trusted execution environment to the file encryption module in the normal execution environment such that when third-party application software or another module in the normal execution environment needs to write a file or third-party application software or another module in the normal execution environment needs to read a file, the file encryption module may collaborate with the storage controller, the file encryption module sends the key index to the storage controller, and the storage controller encrypts or decrypts the file. This implements a write operation or a read operation on the file.

In a possible implementation, decrypting, in the trusted execution environment, the initial key to obtain a file key includes decrypting, in the trusted execution environment, the initial key using a first derivation key, to obtain the file key.

In a possible implementation, before decrypting, in the trusted execution environment, the initial key using a first derivation key, to obtain the file key, the method further includes obtaining, in the trusted execution environment, a message authentication code (MAC) of a personal identification number (PIN), obtaining, in the trusted execution environment, a private key, obtaining, in the trusted execution environment, a first encryption factor, and encrypting, in the trusted execution environment, the MAC using the private key and the first encryption factor, to obtain the first derivation key.

In a possible implementation, before decrypting, in the trusted execution environment, the initial key using a first derivation key, to obtain the file key, the method further includes obtaining, in the trusted execution environment, a first encryption factor, obtaining, in the trusted execution environment, a private key, and encrypting, in the trusted execution environment, the first encryption factor using the private key, to obtain the first derivation key.

In a possible implementation, after sending, in the trusted execution environment, the key index to the file encryption module in the normal execution environment, the method further includes receiving, by the file encryption module in the normal execution environment, a processing instruction with respect to the file, obtaining, by the file encryption module in the normal execution environment, a key type of the file, obtaining, by the file encryption module in the normal execution environment, the key index corresponding to the key type, obtaining, by the file encryption module in the normal execution environment, an initial vector, where the initial vector is used together with the file key to encrypt the file, generating, by the file encryption module in the normal execution environment, a processing request with respect to the file based on the key index and the initial vector, and sending, by the file encryption module in the normal execution environment, the processing request to the storage controller.

In a possible implementation, after sending, by the file encryption module in the normal execution environment, the processing request to the storage controller, the method further includes receiving, by the storage controller, the processing request sent by the file encryption module in the normal execution environment, obtaining, by the storage controller, the file key that corresponds to the key index and that is in the key register, and encrypting, by the storage controller, the file using the file key and the initial vector, to obtain a ciphertext of the file, and storing the ciphertext of the file in a storage, or obtaining, by the storage controller, a ciphertext of the file in a storage, and decrypting the ciphertext of the file using the file key and the initial vector, to obtain the file.

Because a module or software in the normal execution environment is forbidden to access the key register, in a process of writing the file or reading the file, the module or the software in the normal execution environment cannot steal the file key stored in the key register, and the module or the software in the normal execution environment cannot steal the file key used by the storage controller in a file encryption process or a file decryption process. Therefore, in this embodiment of this application, security of the file key can be ensured in the process of writing the file or reading the file.

In a possible implementation, obtaining, in the normal execution environment, an initial vector includes obtaining, by the file encryption module in the normal execution environment, a ciphertext of the initial vector in the storage, obtaining, by the file encryption module in the normal execution environment, a metadata key, and decrypting, by the file encryption module in the normal execution environment, the ciphertext of the initial vector using the metadata key, to obtain the initial vector.

In a possible implementation, after obtaining, by the file encryption module in the normal execution environment, an initial vector, the method further includes obtaining, by the file encryption module in the normal execution environment, a metadata key, encrypting, by the file encryption module in the normal execution environment, the initial vector using the metadata key, to obtain a ciphertext of the initial vector, and storing, by the file encryption module in the normal execution environment, the ciphertext of the initial vector in the storage.

In a possible implementation, the method further includes decrypting, in the trusted execution environment, the initial key to obtain the metadata key, and sending, in the trusted execution environment, the metadata key to the file encryption module in the normal execution environment.

In a possible implementation, decrypting, in the trusted execution environment, the initial key to obtain the metadata key includes decrypting, in the trusted execution environment, the initial key using a second derivation key, to obtain the metadata key.

In a possible implementation, before decrypting, in the trusted execution environment, the initial key using a second derivation key, to obtain the metadata key, the method further includes obtaining, in the trusted execution environment, the MAC of the PIN, obtaining, in the trusted execution environment, the private key, obtaining, in the trusted execution environment, a second encryption factor, and encrypting, in the trusted execution environment, the MAC using the private key and the second encryption factor, to obtain the second derivation key.

In a possible implementation, before decrypting, in the trusted execution environment, the initial key using a second derivation key, to obtain the metadata key, the method further includes obtaining, in the trusted execution environment, a second encryption factor, obtaining, in the trusted execution environment, the private key, and encrypting, in the trusted execution environment, the second encryption factor using the private key, to obtain the second derivation key.

According to a second aspect, an embodiment of this application provides a key processing method. The method includes receiving, by a storage controller, a processing request with respect to a file sent by a file encryption module in a normal execution environment, where the processing request includes a key index, and the key index is used to indicate a storage location of a file key in a key register of the storage controller, obtaining, by the storage controller, a file key that corresponds to the key index and that is in the key register, where the file encryption module in the normal execution environment is forbidden to access the key register, and encrypting, by the storage controller, the file using the file key, to obtain a ciphertext of the file, and storing the ciphertext of the file in a storage, or obtaining, by the storage controller, a ciphertext of the file in a storage, and decrypting the ciphertext of the file using the file key, to obtain the file.

In the second aspect, because a module or software in the normal execution environment is forbidden to access the key register, in a process of writing the file or reading the file, the module or the software in the normal execution environment cannot steal the file key stored in the key register, and the module or the software in the normal execution environment cannot steal the file key used by the storage controller in a file encryption process or a file decryption process. Therefore, in this embodiment of this application, security of the file key can be ensured in the process of writing the file or reading the file.

In a possible implementation, the processing request further includes an initial vector, and encrypting, by the storage controller, the file using the file key, to obtain a ciphertext of the file includes encrypting, by the storage controller, the file using the file key and the initial vector, to obtain the ciphertext of the file.

In a possible implementation, the processing request further includes an initial vector, and the decrypting, by the storage controller, the ciphertext of the file using the file key, to obtain the file includes decrypting, by the storage controller, the ciphertext of the file using the file key and the initial vector, to obtain the file.

According to a third aspect, an embodiment of this application provides a key processing apparatus. The apparatus includes a processor and an interface, and the interface is connected to a storage controller and the processor. The processor is configured to run a software instruction to generate a trusted execution environment and a normal execution environment, implement a function of a file encryption module in the normal execution environment, and further perform the following operations: receiving, in the trusted execution environment, an initial key sent by the file encryption module in the normal execution environment, decrypting, in the trusted execution environment, the initial key to obtain a file key, where the file key is used to encrypt a file, storing, in the trusted execution environment, the file key in a key register of the storage controller through the interface, where the file encryption module in the normal execution environment is forbidden to access the key register, obtaining, in the trusted execution environment, a key index of the file key in the key register through the interface, where the key index is used to indicate a storage location of the file key in the key register, and sending, in the trusted execution environment, the key index to the file encryption module in the normal execution environment.

In the third aspect, the file encryption module in the normal execution environment is forbidden to access a module or information in the trusted execution environment. In a process of generating the file key in the trusted execution environment, the file encryption module in the normal execution environment cannot steal the file key generated in the trusted execution environment. Therefore, the process of generating the file key is secure. In addition, after the file key is generated in the trusted execution environment, the file key is stored, in the trusted execution environment, in the key register of the storage controller. Because the file encryption module in the normal execution environment is forbidden to access the key register, the file encryption module in the normal execution environment cannot steal the file key in the key register of the storage controller. Therefore, the storage environment of the file key is also secure. Furthermore, only the key index of the file key is sent in the trusted execution environment to the file encryption module in the normal execution environment such that when third-party application software or another module in the normal execution environment needs to write a file or third-party application software or another module in the normal execution environment needs to read a file, the file encryption module may collaborate with the storage controller, the file encryption module sends the key index to the storage controller, and the storage controller encrypts or decrypts the file. This implements a write operation or a read operation on the file.

In a possible implementation, the processor is configured to decrypt, in the trusted execution environment, the initial key using a first derivation key, to obtain the file key.

In a possible implementation, the processor is further configured to obtain, in the trusted execution environment, a MAC of a PIN, obtain, in the trusted execution environment, a private key, obtain, in the trusted execution environment, a first encryption factor, and encrypt, in the trusted execution environment, the MAC using the private key and the first encryption factor, to obtain the first derivation key.

In a possible implementation, the processor is further configured to obtain, in the trusted execution environment, a first encryption factor, obtain, in the trusted execution environment, a private key, and encrypt, in the trusted execution environment, the first encryption factor using the private key, to obtain the first derivation key.

In a possible implementation, the processor is further configured to implement, in the normal execution environment, the following functions of the file encryption module: receiving a processing instruction with respect to the file, obtaining a key type of the file, obtaining the key index corresponding to the key type, obtaining an initial vector, where the initial vector is used together with the file key to encrypt the file, generating a processing request with respect to the file based on the key index and the initial vector, and sending the processing request to the storage controller.

In a possible implementation, the apparatus further includes the storage controller. The storage controller includes an encryption apparatus and a key register. The encryption apparatus of the storage controller is configured to receive the processing request sent by the file encryption module in the normal execution environment, obtain the file key that corresponds to the key index and that is in the key register, and encrypt the file using the file key and the initial vector, to obtain a ciphertext of the file, and store the ciphertext of the file in a storage, or obtain a ciphertext of the file in a storage, and decrypt the ciphertext of the file using the file key and the initial vector, to obtain the file.

In a possible implementation, the processor is further configured to implement, in the normal execution environment, the following functions of the file encryption module: obtaining a ciphertext of the initial vector in the storage, obtaining a metadata key, and decrypting the ciphertext of the initial vector using the metadata key, to obtain the initial vector.

In a possible implementation, the processor is further configured to implement, in the normal execution environment, the following functions of the file encryption module: obtaining a metadata key, encrypting the initial vector using the metadata key, to obtain a ciphertext of the initial vector, and storing the ciphertext of the initial vector in the storage.

In a possible implementation, the processor is further configured to decrypt, in the trusted execution environment, the initial key to obtain the metadata key, and send, in the trusted execution environment, the metadata key to the file encryption module in the normal execution environment.

In a possible implementation, the processor is further configured to decrypt, in the trusted execution environment, the initial key using a second derivation key, to obtain the metadata key.

In a possible implementation, the processor is further configured to obtain, in the trusted execution environment, the MAC of the PIN, obtain, in the trusted execution environment, the private key, obtain, in the trusted execution environment, a second encryption factor, and encrypt, in the trusted execution environment, the MAC using the private key and the second encryption factor, to obtain the second derivation key.

In a possible implementation, the processor is further configured to obtain, in the trusted execution environment, a second encryption factor, obtain, in the trusted execution environment, the private key, and encrypt, in the trusted execution environment, the second encryption factor using the private key, to obtain the second derivation key.

According to a fourth aspect, an embodiment of this application provides a storage controller. The storage controller includes an encryption apparatus and a key register. The key register is configured to store a file key. The encryption apparatus is configured to receive a processing request with respect to a file sent by a file encryption module in a normal execution environment, where the processing request includes a key index, and the key index is used to indicate a storage location of a file key in the key register, obtain a file key that corresponds to the key index and that is in the key register, where the file encryption module in the normal execution environment is forbidden to access the key register, and encrypt the file using the file key, to obtain a ciphertext of the file, and store the ciphertext of the file in a storage, or obtain a ciphertext of the file in a storage, and decrypt the ciphertext of the file using the file key, to obtain the file.

In the fourth aspect, because a module or software in the normal execution environment is forbidden to access the key register, in a process of writing the file or reading the file, the module or the software in the normal execution environment cannot steal the file key stored in the key register, and the module or the software in the normal execution environment cannot steal the file key used by the encryption apparatus in a file encryption process or a file decryption process. Therefore, in this embodiment of this application, security of the file key can be ensured in the process of writing the file or reading the file.

In a possible implementation, the processing request further includes an initial vector. The encryption apparatus is further configured to encrypt the file using the file key and the initial vector, to obtain the ciphertext of the file.

In a possible implementation, the processing request further includes an initial vector. The encryption apparatus is further configured to decrypt the ciphertext of the file using the file key and the initial vector, to obtain the file.

According to a fifth aspect, an embodiment of this application provides a key processing apparatus. The apparatus includes a receiving module configured to receive, in a trusted execution environment, an initial key sent by a file encryption module in a normal execution environment, a first decryption module configured to decrypt, in the trusted execution environment, the initial key to obtain a file key, where the file key is used to encrypt a file, a storage module configured to store, in the trusted execution environment, the file key in a key register of a storage controller, where the file encryption module in the normal execution environment is forbidden to access the key register, an obtaining module configured to obtain, in the trusted execution environment, a key index of the file key in the key register, where the key index is used to indicate a storage location of the file key in the key register, and a sending module configured to send, in the trusted execution environment, the key index to the file encryption module in the normal execution environment.

In the fifth aspect, the file encryption module in the normal execution environment is forbidden to access a module or information in the trusted execution environment. In a process of generating the file key in the trusted execution environment, the file encryption module in the normal execution environment cannot steal the file key generated in the trusted execution environment. Therefore, the process of generating the file key is secure. In addition, after the file key is generated in the trusted execution environment, the file key is stored, in the trusted execution environment, in the key register of the storage controller. Because the file encryption module in the normal execution environment is forbidden to access the key register, the file encryption module in the normal execution environment cannot steal the file key in the key register of the storage controller. Therefore, the storage environment of the file key is also secure. Furthermore, only the key index of the file key is sent in the trusted execution environment to the file encryption module in the normal execution environment such that when third-party application software or another module in the normal execution environment needs to write a file or third-party application software or another module in the normal execution environment needs to read a file, the file encryption module may collaborate with the storage controller, the file encryption module sends the key index to the storage controller, and the storage controller encrypts or decrypts the file. This implements a write operation or a read operation on the file.

In a possible implementation, the first decryption module is further configured to decrypt, in the trusted execution environment, the initial key using a first derivation key, to obtain the file key.

In a possible implementation, the apparatus further includes a first encryption module. The first encryption module is configured to obtain, in the trusted execution environment, a MAC of a PIN, obtain, in the trusted execution environment, a private key, obtain, in the trusted execution environment, a first encryption factor, and encrypt, in the trusted execution environment, the MAC using the private key and the first encryption factor, to obtain the first derivation key.

In a possible implementation, the apparatus further includes a second encryption module. The second encryption module is configured to obtain, in the trusted execution environment, a first encryption factor, obtain, in the trusted execution environment, a private key, and encrypt, in the trusted execution environment, the first encryption factor using the private key, to obtain the first derivation key.

In a possible implementation, the apparatus further includes the file encryption module. The file encryption module is configured to receive, in the normal execution environment, a processing instruction with respect to a file, obtain, in the normal execution environment, a key type of the file, obtain, in the normal execution environment, a key index corresponding to the key type, obtain, in the normal execution environment, an initial vector, generate, in the normal execution environment, a processing request with respect to the file based on the key index and the initial vector, and send, in the normal execution environment, the processing request to the storage controller.

In a possible implementation, the file encryption module is further configured to obtain, in the normal execution environment, a ciphertext of the initial vector in a storage, obtain, in the normal execution environment, a metadata key, and decrypt, in the normal execution environment, the ciphertext of the initial vector using the metadata key, to obtain the initial vector.

In a possible implementation, the file encryption module is further configured to obtain, in the normal execution environment, a metadata key, encrypt, in the normal execution environment, the initial vector using the metadata key, to obtain a ciphertext of the initial vector, and store, in the normal execution environment, the ciphertext of the initial vector in a storage.

In a possible implementation, the apparatus further includes a second decryption module. The second decryption module is configured to decrypt, in the trusted execution environment, the initial key to obtain the metadata key. The sending module is further configured to send, in the trusted execution environment, the metadata key to the file encryption module in the normal execution environment.

In a possible implementation, the second decryption module is further configured to decrypt, in the trusted execution environment, the initial key using a second derivation key, to obtain the metadata key.

In a possible implementation, the apparatus further includes a third encryption module. The third encryption module is configured to obtain, in the trusted execution environment, the MAC of the PIN, obtain, in the trusted execution environment, the private key, obtain, in the trusted execution environment, a second encryption factor, and encrypt, in the trusted execution environment, the MAC using the private key and the second encryption factor, to obtain the second derivation key.

In a possible implementation, the apparatus further includes a fourth encryption module. The fourth encryption module is configured to obtain, in the trusted execution environment, a second encryption factor, obtain, in the trusted execution environment, the private key, and encrypt, in the trusted execution environment, the second encryption factor using the private key, to obtain the second derivation key.

According to a sixth aspect, an embodiment of this application provides a computer-readable storage medium. The computer-readable storage medium stores an instruction, and when the instruction is run on a computer or a processor, the computer or the processor is enabled to perform the method according to any one of the first aspect or the possible implementations of the first aspect.

According to a seventh aspect, an embodiment of this application provides a computer-readable storage medium. The computer-readable storage medium stores an instruction, and when the instruction is run on a computer or a processor, the computer or the processor is enabled to perform the method according to any one of the second aspect or the possible implementations of the second aspect.

According to an eighth aspect, an embodiment of this application provides a computer program product including an instruction. When the computer program product runs on a computer or a processor, the computer or the processor is enabled to perform the method in any one of the first aspect or the possible implementations of the first aspect.

According to a ninth aspect, an embodiment of this application provides a computer program product including an instruction. When the computer program product runs on a computer or a processor, the computer or the processor is enabled to perform the method in any one of the second aspect or the possible implementations of the second aspect.

DESCRIPTION OF EMBODIMENTS

Figure 1:
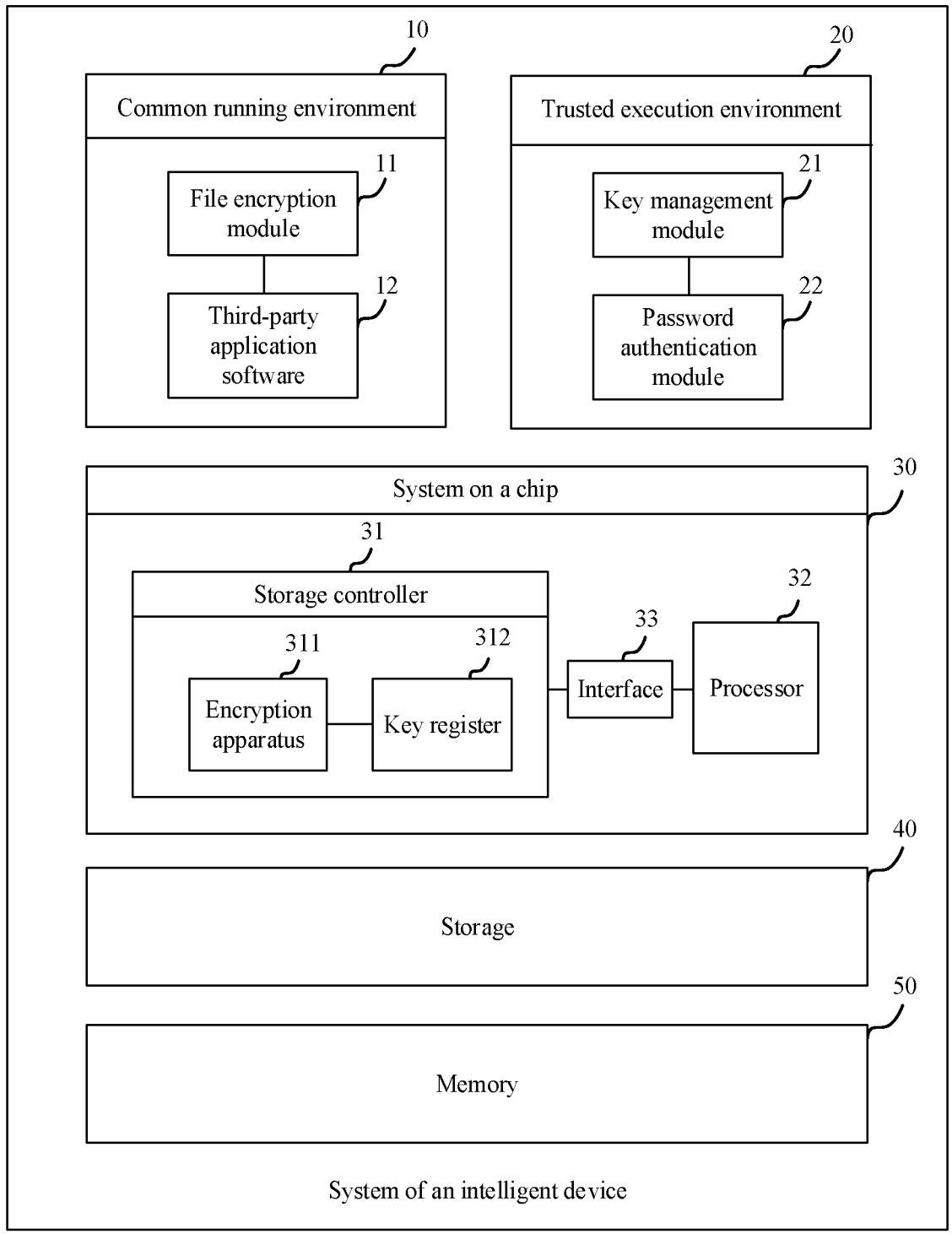
FIG. 1 is a schematic diagram of a system of an intelligent device according to an embodiment of this application.

FIG. 1 is a schematic diagram of a system of an intelligent device according to an embodiment of this application. The system of the intelligent device includes a normal execution environment 10, a trusted execution environment 20, a system on a chip 30, a storage 40, and a memory 50. A file encryption module 11 and a third-party application software 12 may run in the normal execution environment 10. A key management module 21 and a password authentication module 22 may run in the trusted execution environment 20. The system on a chip 30 includes a storage controller 31, a processor 32, and an interface 33. The processor 32 is connected to the storage controller 31 through the interface 33. The interface 33 may be a bus or another connection component that is configured to connect the processor 32 and the storage controller 31. The storage controller 31 includes an encryption apparatus 311 and a key register 312. For example, the storage 40 is configured to permanently store data. If a power supply is turned off or interrupted, data in the storage 40 is not lost. For example, the storage 40 may be a non-volatile memory (NVM). For example, the memory 50 is configured to temporarily store data. If the power supply is turned off or interrupted, data in the memory 50 is lost. For example, the memory 50 may be a volatile memory (such random-access memory (RAM)). In addition, there may be one or more storages 40. In the embodiments of this application, one or more storages 40 may be used to store data.

In the embodiment shown in FIG. 1, a module or software in the normal execution environment 10 is forbidden to access a module or information in the trusted execution environment 20. The file encryption module 11 in the normal execution environment 10 may send an initial key to the key management module 21 in the trusted execution environment 20. In addition, the module or the software in the normal execution environment 10 is forbidden to access the key register 312 in the storage controller 31. The file encryption module 11 in the normal execution environment 10 may send a processing request to the encryption apparatus 311 in the storage controller 31, where the processing request may be a write request or a read request.

In the embodiment shown in FIG. 1, it should be noted that, the processor 32 in this embodiment of this application may be an integrated circuit chip or a part of an integrated circuit chip, and has a signal processing capability. The processor 32 may be a general-purpose processor, a digital signal processor (DSP), an artificial intelligence processor, a microcontroller, or a microprocessor, and can read and run a software instruction in the storage 40 to implement a related function. Certainly, the processor 32 may alternatively read and run a software instruction in another storage to implement a related function. This is not limited to the storage 40.

In the embodiment shown in FIG. 1, the processor 32 is configured to run the software instruction to generate the normal execution environment 10 and the trusted execution environment 20, implement a function of the file encryption module 11 in the normal execution environment 10, and implement a function of the key management module 21 in the trusted execution environment 20.

The storage controller 31 may be an apparatus including a logic circuit, a transistor, or other hardware. The storage controller 31 is configured to implement access to and control on the storage 40, and may further implement access to and control on the memory 50. The encryption apparatus 311 may be a hardware accelerator apparatus, or a processor that runs software such that the processor implements a related function of the encryption apparatus 311 by running the software. The key register 312 is a register unit configured to temporarily store data.

Figure 2A:
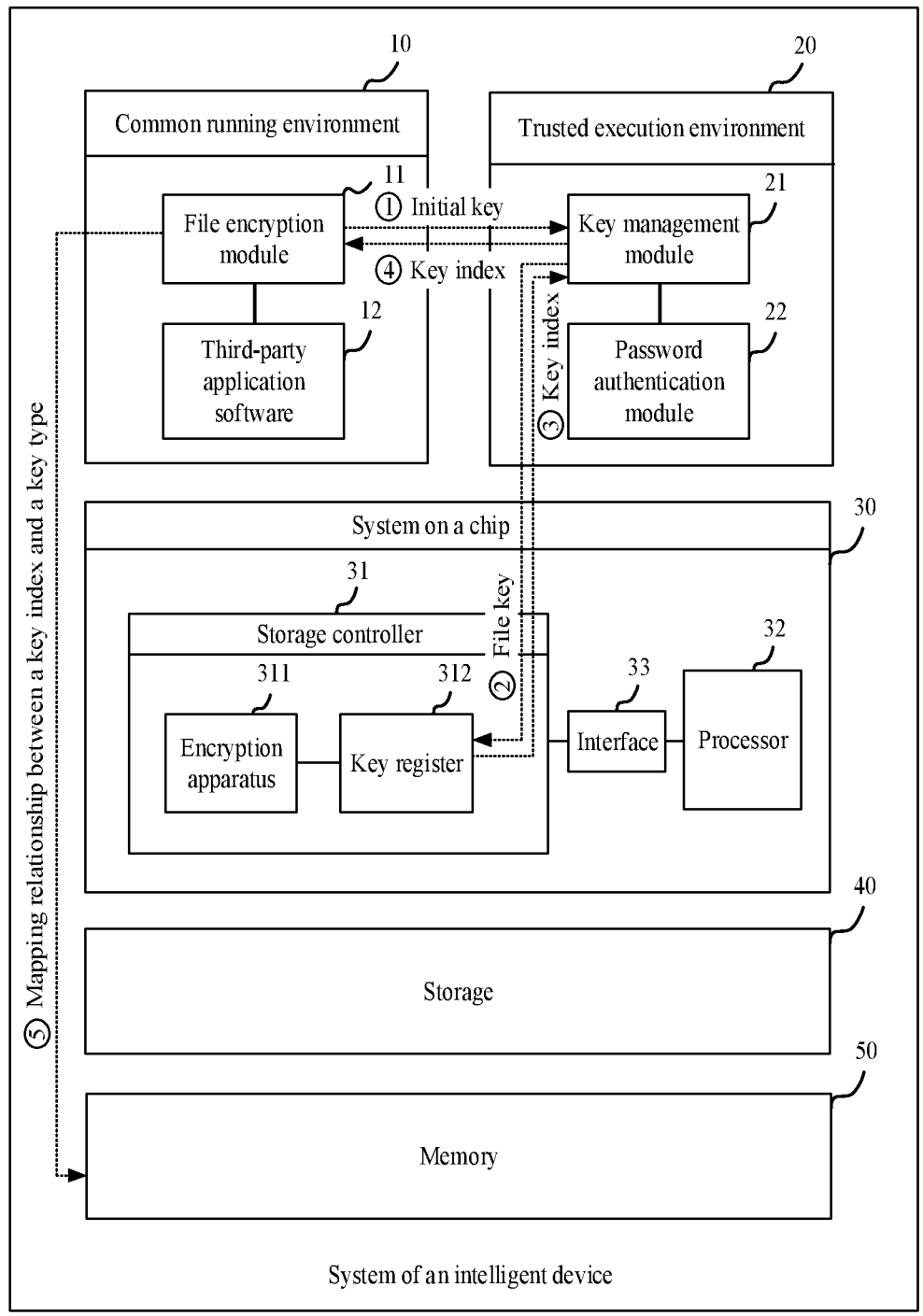
FIG. 2A is a schematic diagram of generating a file key by an intelligent device according to an embodiment of this application.

FIG. 2A is a schematic diagram of generating a file key by an intelligent device according to an embodiment of this application. The following describes a process of generating a file key in this embodiment of this application. First, a file encryption module 11 in a normal execution environment 10 sends an initial key to a key management module 21 in a trusted execution environment 20, where the initial key may be a pre-generated random number. Then, the key management module 21 decrypts the initial key to obtain a file key. Then, the key management module 21 stores the file key in a key register 312 of a storage controller 31 of a system on a chip 30, where the file encryption module 11 in the normal execution environment 10 is forbidden to access the key register 312 in the storage controller 31. Then, the key management module 21 obtains a key index of the file key in the key register 312, where the key index is used to indicate a storage location of the file key in the key register 312. And then, the key management module 21 sends the key index to the file encryption module 11. Finally, the file encryption module 11 stores, in a memory 50, the key index corresponding to the file key.

In the embodiment shown in FIG. 2A, a module or software in the normal execution environment 10 is forbidden to access a module or information in the trusted execution environment 20. In a process in which the key management module 21 generates the file key, the module or the software in the normal execution environment 10 cannot steal the file key generated by the key management module 21. Therefore, the process of generating the file key is secure. In addition, after the key management module 21 generates the file key, the key management module 21 stores the file key in the key register 312 of the storage controller 31. Because the module or the software in the normal execution environment 10 is forbidden to access the key register 312 of the storage controller 31, the module or the software in the normal execution environment 10 cannot steal the file key in the key register 312 of the storage controller 31. Therefore, the storage environment of the file key is also secure. Furthermore, the key management module 21 in the trusted execution environment 20 sends only the key index of the file key to the file encryption module 11 in the normal execution environment 10 such that when third-party application software 12 or another module in the normal execution environment 10 needs to write a file or third-party application software 12 or another module in the normal execution environment 10 needs to read a file, the file encryption module 11 may collaborate with the storage controller 31, the file encryption module 11 sends the key index to the storage controller 31, and the storage controller 31 encrypts or decrypts the file. This implements a write operation or a read operation on the file.

In the embodiment shown in FIG. 2A, before the file encryption module 11 in the normal execution environment 10 sends the initial key to the key management module 21 in the trusted execution environment 20, the file encryption module 11 in the normal execution environment 10 has negotiated a key type of the currently generated file key with the key management module 21 in the trusted execution environment 20. Therefore, after the file encryption module 11 stores, in the memory 50, the key index corresponding to the file key, the file encryption module 11 may establish a mapping relationship between the key index of the file and the key type, and store, in the memory 50, the mapping relationship between the key index and the key type.

The key type of the file refers to types of file keys used to encrypt different files. For example, the key type of the file may be a user file key, and the user file key is used to encrypt a user file. For another example, the key type of the file may be a system file key, and the system file key is used to encrypt a system file.

Table 1 shows an example of the mapping relationship, stored in the memory 50 by the file encryption module 11, between the key index and the key type.

TABLE 1

| Key index | Key type |
|---|---|
| Key 1 | User file key |
| Key 2 | System file key |
| . . . | . . . |

Table 2 shows an example of a mapping relationship, stored by the key register 312, between a key index and a key type.

TABLE 2

| Key index | Key type |
|---|---|
| Key 1 | 11111111 |
| Key 2 | 22222222 |
| . . . | . . . |

In the embodiment shown in FIG. 2A, in a technical scenario in which a system of the intelligent device is started for the first time or is restored to factory settings, before the file encryption module 11 in the normal execution environment 10 sends the initial key to the key management module 21 in the trusted execution environment 20, the file encryption module 11 in the normal execution environment 10 first generates the initial key using a random number generator. Then, the file encryption module 11 in the normal execution environment 10 stores the initial key in the storage 40. In the technical scenario in which the system of the intelligent device is started for the first time or is restored to factory settings, no initial key exists in the system of the intelligent device. Therefore, the file encryption module 11 in the normal execution environment 10 needs to generate the initial key, and store the initial key in the storage 40 such that the intelligent device can obtain the initial key from the storage 40 after being restarted.

In the embodiment shown in FIG. 2A, in a technical scenario in which the system of the intelligent device is powered on or restarted, before the file encryption module 11 in the normal execution environment 10 sends the initial key to the key management module 21 in the trusted execution environment 20, the file encryption module 11 in the normal execution environment 10 may directly obtain the initial key from the storage 40. In the technical scenario in which the system of the intelligent device is powered on or restarted, the storage 40 of the system of the intelligent device has already stored the initial key. Therefore, the file encryption module 11 in the normal execution environment 10 may directly obtain the initial key from the storage 40.

In an implementable embodiment, the key management module 21 in the trusted execution environment 20 may decrypt the initial key using a first derivation key, to obtain the file key. Further, the key management module 21 in the trusted execution environment 20 may decrypt the initial key in an Advanced Encryption Standard (AES) cipher block chaining (CBC) mode using the first derivation key, to obtain the file key.

In an implementable embodiment, before the key management module 21 in the trusted execution environment 20 decrypts the initial key using the first derivation key, to obtain the file key, the first derivation key needs to be first generated. The following briefly describes a specific manner of generating the first derivation key. First, the key management module 21 in the trusted execution environment 20 obtains a MAC that is of a PIN and that is in the password authentication module 22. Then, the key management module 21 in the trusted execution environment 20 obtains a private key in the system on a chip 30, where the private key may be a one time programmable (OTP) hardware unique key (HUK) (a private symmetric key of the chip) in the system on a chip 30, and the private key cannot be read by software or a module in the normal execution environment 10. And then, the key management module 21 in the trusted execution environment 20 obtains a first encryption factor, where the first encryption factor may be a random number generated by the random number generator in the system on a chip 30, or certainly, may be a pre-generated fixed value. Finally, the key management module 21 in the trusted execution environment 20 encrypts the MAC using the private key and the first encryption factor, to obtain the first derivation key. Further, the key management module 21 in the trusted execution environment 20 may encrypt the MAC based on AES-CBC, the private key, and the first encryption factor, to obtain the first derivation key.

Before the key management module 21 in the trusted execution environment 20 obtains the MAC of the PIN in the password authentication module 22, the password authentication module 22 in the trusted execution environment 20 obtains the PIN entered by a user, where the PIN may be, for example, a power-on password of the intelligent device. Then, the password authentication module 22 in the trusted execution environment 20 generates the MAC based on the PIN. In addition, the user enters the PIN in a plurality of manners. For example, the user enters the PIN using a numeric keyboard, in a fingerprint recognition manner, or in a facial recognition manner.

Figure 2B:
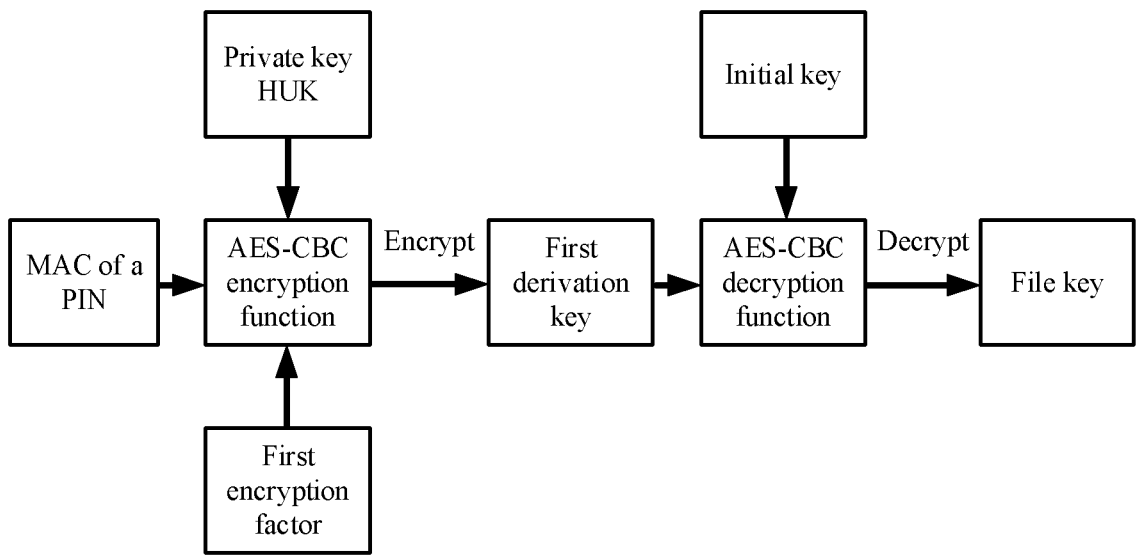
FIG. 2B is a schematic diagram of generating a file key.

FIG. 2B is a schematic diagram of generating a file key. With reference to FIG. 2A and FIG. 2B, first, the key management module 21 in the trusted execution environment 20 obtains a MAC of a PIN of the password authentication module 22. The key management module 21 obtains a first encryption factor in the storage 40. The key management module 21 obtains an OTP private key HUK in the system on a chip 30. Then, the key management module 21 uses the MAC of the PIN, the private key HUK, and the first encryption factor as parameter inputs of an AES-CBC encryption function such that the AES-CBC encryption function outputs a first derivation key. And then, the key management module 21 uses the first derivation key and an initial key as parameter inputs of an AES-CBC decryption function such that the AES-CBC decryption function outputs the file key.

In an implementable embodiment, before the key management module 21 in the trusted execution environment 20 decrypts the initial key using the first derivation key, to obtain the file key, the first derivation key needs to be first generated. The following briefly describes another specific manner of generating the first derivation key. First, the key management module 21 in the trusted execution environment 20 obtains a first encryption factor, where the first encryption factor may be a random number generated by the random number generator in the system on a chip 30, or certainly, may be a pre-generated fixed value. Then, the key management module 21 in the trusted execution environment 20 obtains a private key, where the private key may be a private symmetric key in the system on a chip 30, and the private key cannot be read by software or a module in the normal execution environment 10. Finally, the key management module 21 in the trusted execution environment 20 encrypts the first encryption factor using the private key, to obtain the first derivation key.

Figure 2C:
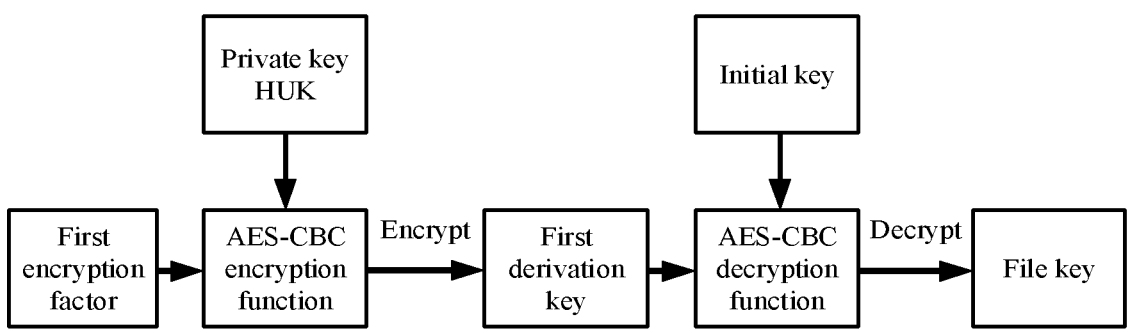
FIG. 2C is another schematic diagram of generating a file key.

FIG. 2C is another schematic diagram of generating a file key. With reference to FIG. 2A and FIG. 2C, first, the key management module 21 in the trusted execution environment 20 obtains a first encryption factor in the storage 40. The key management module 21 obtains an OTP private key HUK in the system on a chip 30. Then, the key management module 21 uses the private key HUK and the first encryption factor as parameter inputs of an AES-CBC encryption function such that the AES-CBC encryption function outputs a first derivation key. And then, the key management module 21 uses the first derivation key and an initial key as parameter inputs of an AES-CBC decryption function such that the AES-CBC decryption function outputs the file key.

In an implementable embodiment, to ensure security of an initial vector, the key management module 21 in the trusted execution environment 20 may further decrypt the initial key to obtain a metadata key, where the metadata key is used to encrypt the initial vector, and the initial vector is used together with the file key to encrypt the file. Then, the key management module 21 sends the metadata key to the file encryption module 11 in the normal execution environment 10. And then, the file encryption module 11 in the normal execution environment 10 establishes a mapping relationship between a key index and the metadata key. Finally, the file encryption module 11 in the normal execution environment 10 stores, in the memory 50, the mapping relationship between the key index and the metadata key.

Table 3 shows an example of the mapping relationship, stored in the memory 50 by the file encryption module 11, between the key index and the metadata key.

TABLE 3

| Key index | Metadata key |
| --- | --- |
| Key 3 | 33333333 |
| Key 4 | 44444444 |
| . . . | . . . |

In an implementable embodiment, the key management module 21 in the trusted execution environment 20 may further decrypt the initial key using a second derivation key, to obtain the metadata key. Further, the key management module 21 in the trusted execution environment 20 may decrypt the initial key based on AES-CBC and the second derivation key, to obtain the metadata key.

In an implementable embodiment, before the key management module 21 in the trusted execution environment 20 decrypts the initial key using the second derivation key, to obtain the metadata key, the second derivation key needs to be first generated. The following briefly describes a specific manner of generating the second derivation key. First, the key management module 21 in the trusted execution environment 20 obtains a MAC of a PIN. Then, the key management module 21 in the trusted execution environment 20 obtains a private key in the system on a chip 30, where the private key may be an OTP HUK in the system on a chip 30, and the private key cannot be read by software or a module in the normal execution environment 10. And then, the key management module 21 in the trusted execution environment 20 obtains a second encryption factor, where the second encryption factor may be a random number generated by the random number generator in the system on a chip 30, or certainly, may be a pre-generated fixed value. Finally, the key management module 21 in the trusted execution environment 20 encrypts the MAC using the private key and the second encryption factor, to obtain the second derivation key. Further, the key management module 21 in the trusted execution environment 20 may encrypt the MAC based on AES-CBC, the private key, and the second encryption factor, to obtain the second derivation key.

Figure 2D:
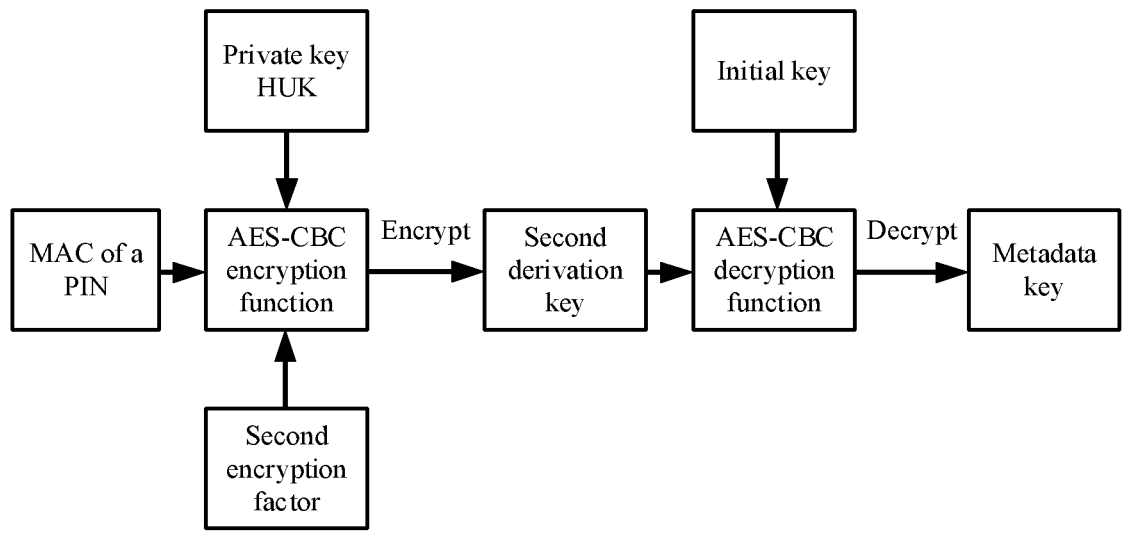
FIG. 2D is a schematic diagram of generating a metadata key.

FIG. 2D is a schematic diagram of generating a metadata key. With reference to FIG. 2A and FIG. 2D, first, the key management module 21 in the trusted execution environment 20 obtains a MAC of a PIN of the password authentication module 22. The key management module 21 obtains a second encryption factor in the storage 40. The key management module 21 obtains an OTP private key HUK in the system on a chip 30. Then, the key management module 21 uses the MAC of the PIN, the private key HUK, and the second encryption factor as parameter inputs of an AES-CBC encryption function such that the AES-CBC encryption function outputs a second derivation key. And then, the key management module 21 uses the second derivation key and an initial key as parameter inputs of an AES-CBC decryption function such that the AES-CBC decryption function outputs the metadata key.

In an implementable embodiment, before the key management module 21 in the trusted execution environment 20 decrypts the initial key using the second derivation key, to obtain the metadata key, the second derivation key needs to be first generated. The following briefly describes a specific manner of generating the second derivation key. First, the key management module 21 in the trusted execution environment 20 obtains a second encryption factor, where the second encryption factor may be a random number generated by the random number generator in the system on a chip 30, or certainly, may be a pre-generated fixed value. Then, the key management module 21 in the trusted execution environment 20 obtains a private key, where the private key may be a private symmetric key in the system on a chip 30, and the private key cannot be read by software or a module in the normal execution environment 10. Finally, the key management module 21 in the trusted execution environment 20 encrypts the second encryption factor using the private key, to obtain the second derivation key.

Figure 2E:
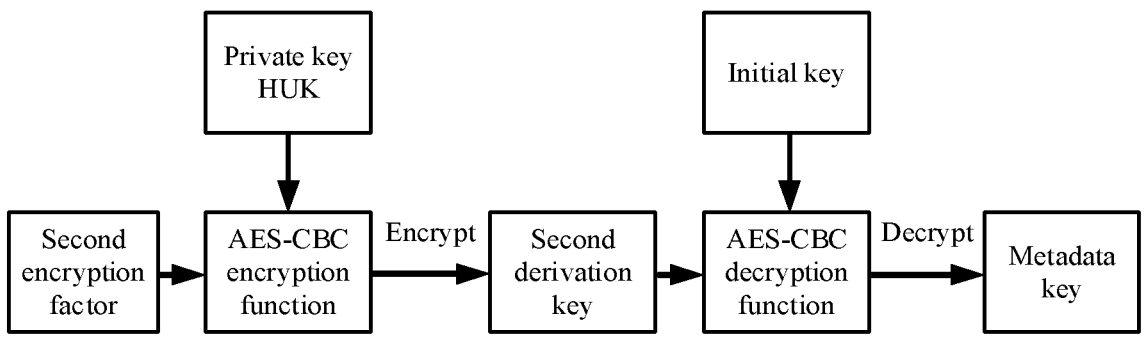
FIG. 2E is another schematic diagram of generating a metadata key.

FIG. 2E is another schematic diagram of generating a metadata key. With reference to FIG. 2A and FIG. 2E, first, the key management module 21 in the trusted execution environment 20 obtains a second encryption factor in the storage 40. The key management module 21 obtains an OTP private key HUK in the system on a chip 30. Then, the key management module 21 uses the private key HUK and the second encryption factor as parameter inputs of an AES-CBC encryption function such that the AES-CBC encryption function outputs a second derivation key. And then, the key management module 21 uses the second derivation key and an initial key as parameter inputs of an AES-CBC decryption function such that the AES-CBC decryption function outputs the metadata key.

Figure 3A:
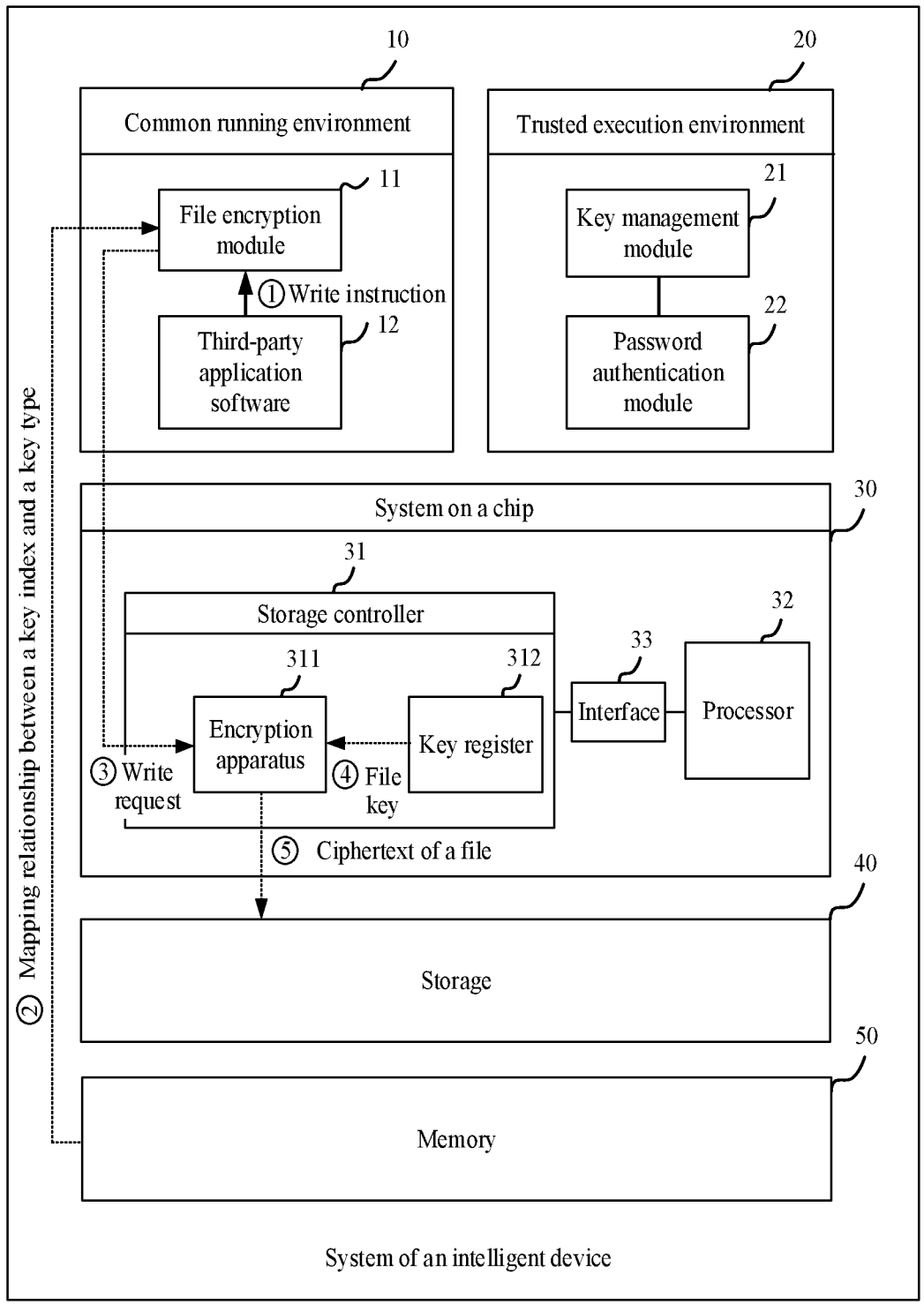
FIG. 3A is a schematic diagram of writing a file into an intelligent device according to an embodiment of this application.

FIG. 3A is a schematic diagram of writing a file into an intelligent device according to an embodiment of this application. The following describes a process of writing a file in this embodiment of this application. First, a file encryption module 11 in a normal execution environment 10 receives a write instruction with respect to the file sent by third-party application software 12 or another module in the normal execution environment 10. Then, the file encryption module 11 obtains a mapping relationship between a key index and a key type from a memory 50, and obtains, based on the mapping relationship between a key index and a key type, a key index corresponding to a key type of the file. Then, the file encryption module 11 generates a random number using a random number generator, and uses the random number as an initial vector of the file, where initial vectors of all files are different, and the random number generator may be set in the normal execution environment 10, a trusted execution environment 20, or a system on a chip 30. Then, the file encryption module 11 stores the initial vector in a data header of the file in a storage 40, where the file includes the data header and a data area, the data header of the file is used to store data such as the initial vector, and the data area of the file is used to store content of the file. Then, the file encryption module 11 generates a write request with respect to the file based on the key index and the initial vector, and the file encryption module 11 sends the write request to an encryption apparatus 311 in a storage controller 31. And then, the encryption apparatus 311 in the storage controller 31 obtains the key index and the initial vector from the write request, and the encryption apparatus 311 obtains a file key that corresponds to the key index and that is in a key register 312. Finally, the encryption apparatus 311 encrypts the file using the file key and the initial vector, to obtain a ciphertext of the file, and stores the ciphertext of the file in the data area of the file in the storage 40.

In the embodiment shown in FIG. 3A, because a module or software in the normal execution environment 10 is forbidden to access the key register 312 in the storage controller 31, in the process of writing the file, the module or the software in the normal execution environment 10 cannot steal the file key stored in the key register 312, and the module or the software in the normal execution environment 10 cannot steal the file key used by the encryption apparatus 311 in a file encryption process. Therefore, in this embodiment of this application, security of the file key can be ensured in the process of writing the file.

In an implementable embodiment, to ensure security of the initial vector, after the file encryption module 11 generates the initial vector, the file encryption module 11 may further encrypt the initial vector using a metadata key, to obtain a ciphertext of the initial vector. Then, the file encryption module 11 stores the ciphertext of the initial vector in the data header of the file in the storage 40. Certainly, the initial vector is not mandatory for file encryption or decryption. In an encryption process, the encryption apparatus 311 may encrypt the file using only the file key, to obtain the ciphertext of the file. In a decryption process, the encryption apparatus 311 may decrypt the ciphertext of the file using only the file key, to obtain the file.

If the ciphertext of the initial vector is stored in the data header of the file in the storage 40, when the file encryption module 11 receives a read instruction with respect to the file sent by the third-party application software 12 or another module in the normal execution environment 10, the file encryption module 11 first obtains the ciphertext of the initial vector from the data header of the file in the storage 40. Then, the file encryption module 11 obtains, based on a mapping relationship between a key index and a metadata key, the metadata key corresponding to the key index. And then, the file encryption module 11 decrypts the ciphertext of the initial vector using the metadata key, to obtain the initial vector. In this case, the file encryption module 11 may obtain the initial vector.

Figure 3B:
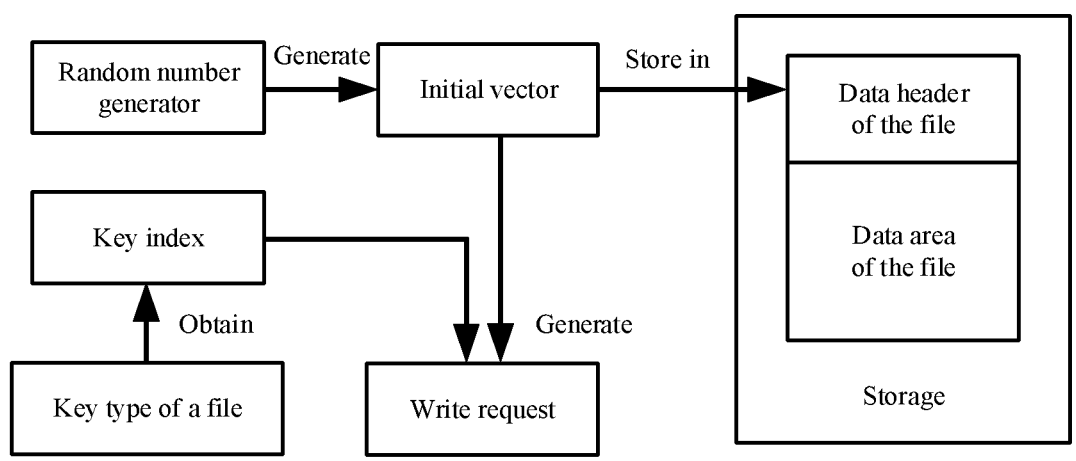
FIG. 3B is a schematic diagram of generating a write request.

FIG. 3B is a schematic diagram of generating a write request. With reference to FIG. 3A and FIG. 3B, first, the file encryption module 11 in the normal execution environment 10 receives a write instruction with respect to a file sent by the third-party application software 12 or another module in the normal execution environment 10. The file encryption module 11 obtains, based on a mapping relationship between a key type and a key index, a key index corresponding to a key type of the file. Then, the file encryption module 11 generates a random number using a random number generator, uses the random number as an initial vector of the file, and stores the initial vector in a data header of the file in the storage 40. Finally, the file encryption module 11 generates a write request with respect to the file based on the key index and the initial vector.

Figure 3C:
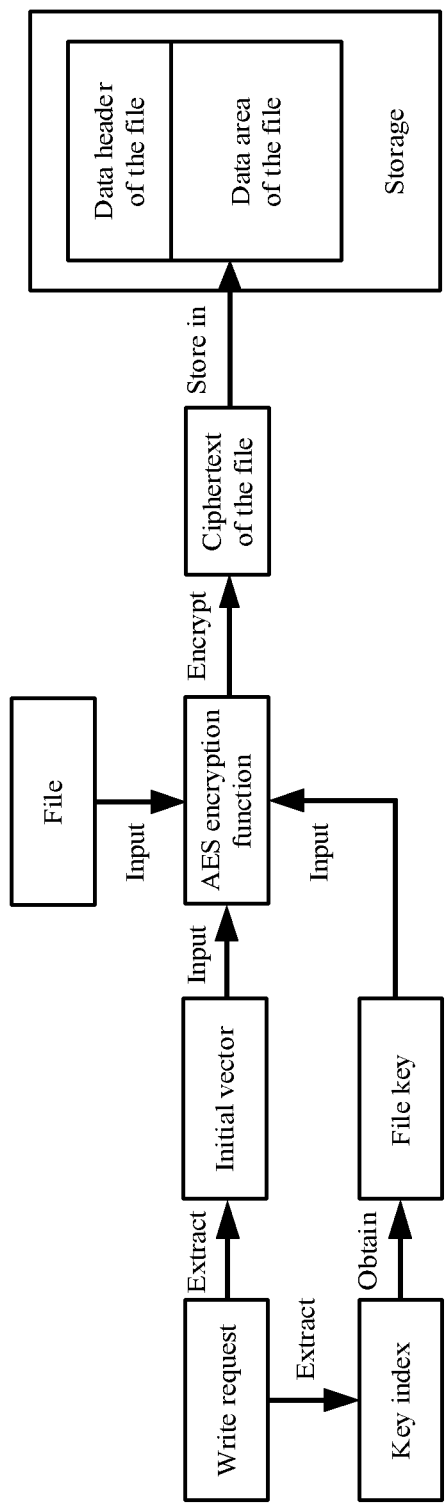
FIG. 3C is a schematic diagram of encrypting a file.

FIG. 3C is a schematic diagram of encrypting a file. With reference to FIG. 3A and FIG. 3C, first, the file encryption module 11 sends a write request to the encryption apparatus 311 in the storage controller 31. Then, the encryption apparatus 311 in the storage controller 31 obtains a key index and an initial vector from the write request. Then, the encryption apparatus 311 obtains a file key that corresponds to the key index and that is in the key register 312. And then, the encryption apparatus 311 uses the file, the file key, and the initial vector as parameter inputs of an AES encryption function such that the AES encryption function outputs a ciphertext of the file. Finally, the encryption apparatus 311 stores the ciphertext of the file in a data area of the file in the storage 40.

Figure 4A:
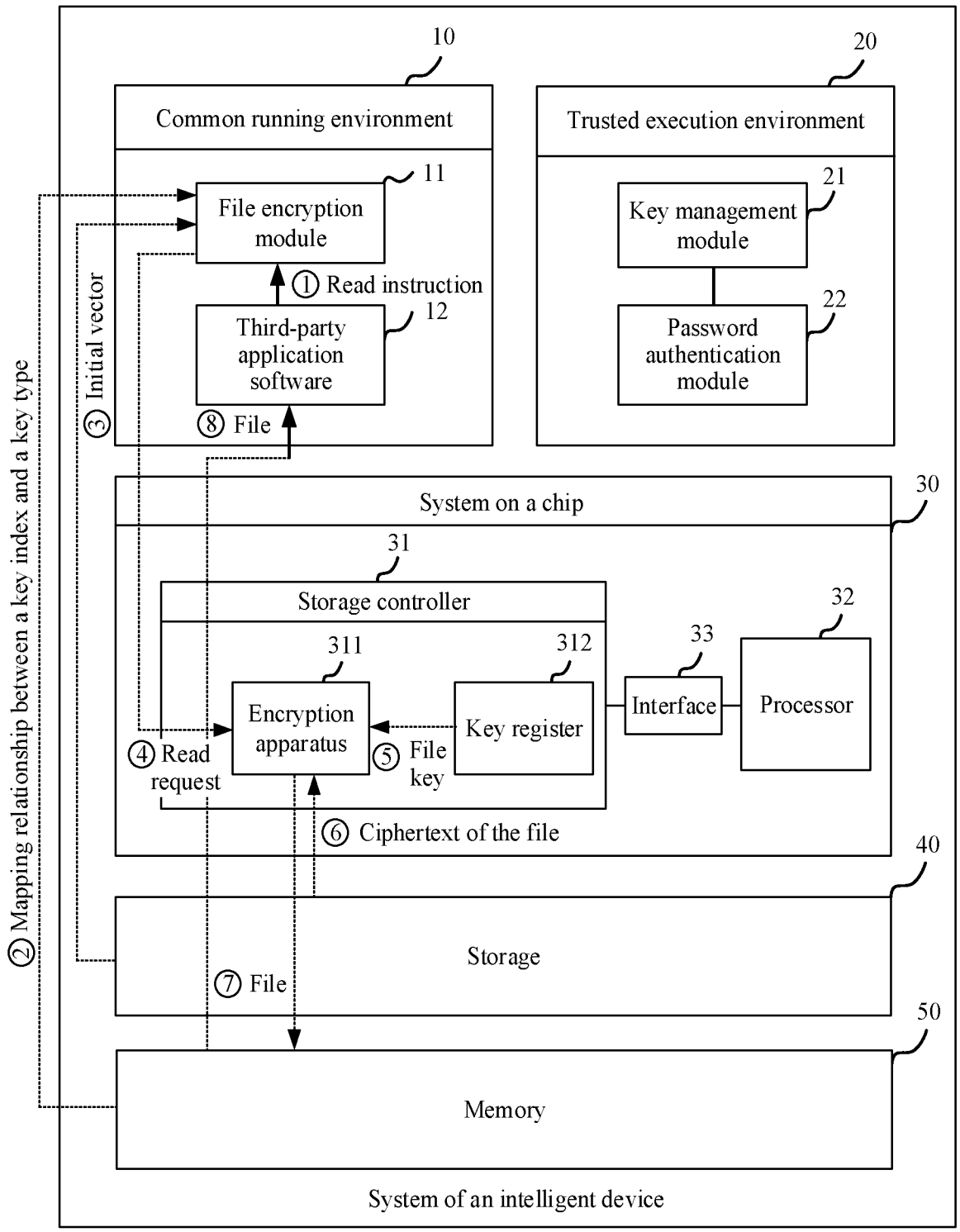
FIG. 4A is a schematic diagram of reading a file by an intelligent device according to an embodiment of this application.

FIG. 4A is a schematic diagram of reading a file by an intelligent device according to an embodiment of this application. The following describes a process of reading a file in this embodiment of this application. First, a file encryption module 11 in a normal execution environment 10 receives a read instruction with respect to the file sent by third-party application software 12 or another module in the normal execution environment 10. Then, the file encryption module 11 obtains a mapping relationship between a key index and a key type from a memory 50, and obtains, based on the mapping relationship between a key index and a key type, a key index corresponding to a key type of the file. Then, the file encryption module 11 obtains an initial vector from a data header of the file in a storage 40, where the file includes the data header and a data area, the data header of the file is used to store data such as the initial vector, and the data area of the file is used to store content of the file. Then, the file encryption module 11 generates a read request with respect to the file based on the key index and the initial vector, and the file encryption module 11 sends the read request to an encryption apparatus 311 in a storage controller 31. Then, the encryption apparatus 311 obtains the key index and the initial vector from the read request, and the encryption apparatus 311 obtains a file key that corresponds to the key index and that is in a key register 312. And then, the encryption apparatus 311 decrypts a ciphertext of the file in the storage using the file key and the initial vector, to obtain the file, and then stores the file obtained through decryption into the memory 50. Finally, the third-party application software 12 or another module in the normal execution environment 10 reads the file in the memory 50.

In an implementable embodiment, because a module or software in the normal execution environment 10 is forbidden to access the key register 312 in the storage controller 31, in the process of reading the file, the module or the software in the normal execution environment 10 cannot steal the file key stored in the key register 312, and the module or the software in the normal execution environment 10 cannot steal the file key used by the encryption apparatus 311 in a file decryption process. Therefore, in this embodiment of this application, security of the file key can be ensured in the process of reading the file.

In an implementable embodiment, if the file encryption module 11 pre-encrypts the initial vector based on a metadata key to obtain a ciphertext of the initial vector, and stores the ciphertext of the initial vector in the data header of the file in the storage 40, the file encryption module 11 first obtains the ciphertext of the initial vector in the data header of the file in the storage 40. Then, the file encryption module 11 obtains, based on a mapping relationship between a key index and a metadata key, a metadata key corresponding to the key index, and decrypts the ciphertext of the initial vector using the metadata key, to obtain the initial vector.

Figure 4B:
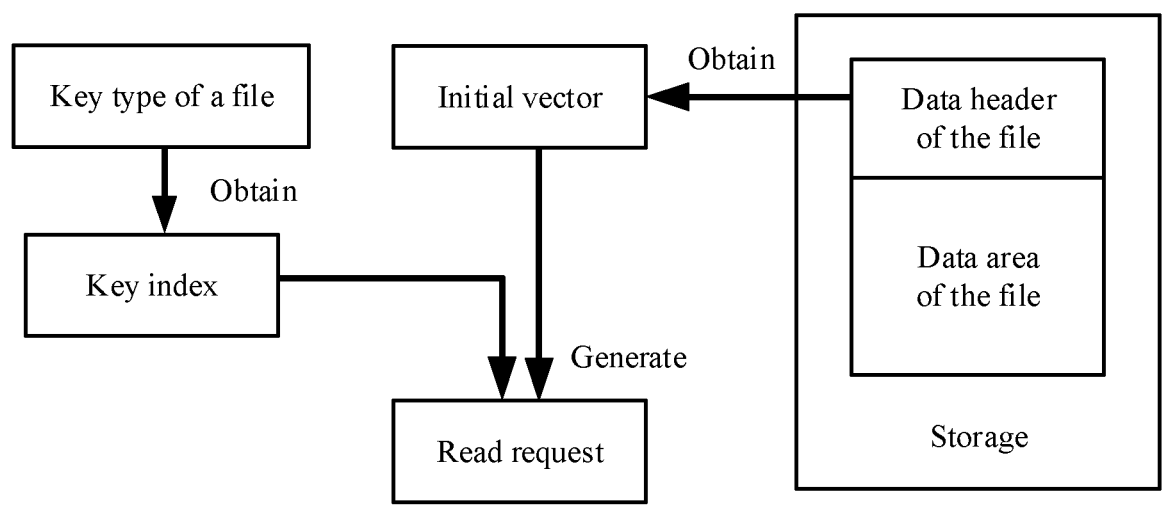
FIG. 4B is a schematic diagram of generating a read request.

FIG. 4B is a schematic diagram of generating a read request. With reference to FIG. 4A and FIG. 4B, first, the file encryption module 11 in the normal execution environment 10 receives a read instruction with respect to a file sent by the third-party application software 12 or another module in the normal execution environment 10. Then, the file encryption module 11 obtains a mapping relationship between a key index and a key type from the memory 50, and obtains, based on the mapping relationship between a key index and a key type, a key index corresponding to a key type of the file. Then, the file encryption module 11 obtains an initial vector from a data header of the file in the storage 40. And then, the file encryption module 11 generates a read request with respect to the file based on the key index and the initial vector.

Figure 4C:
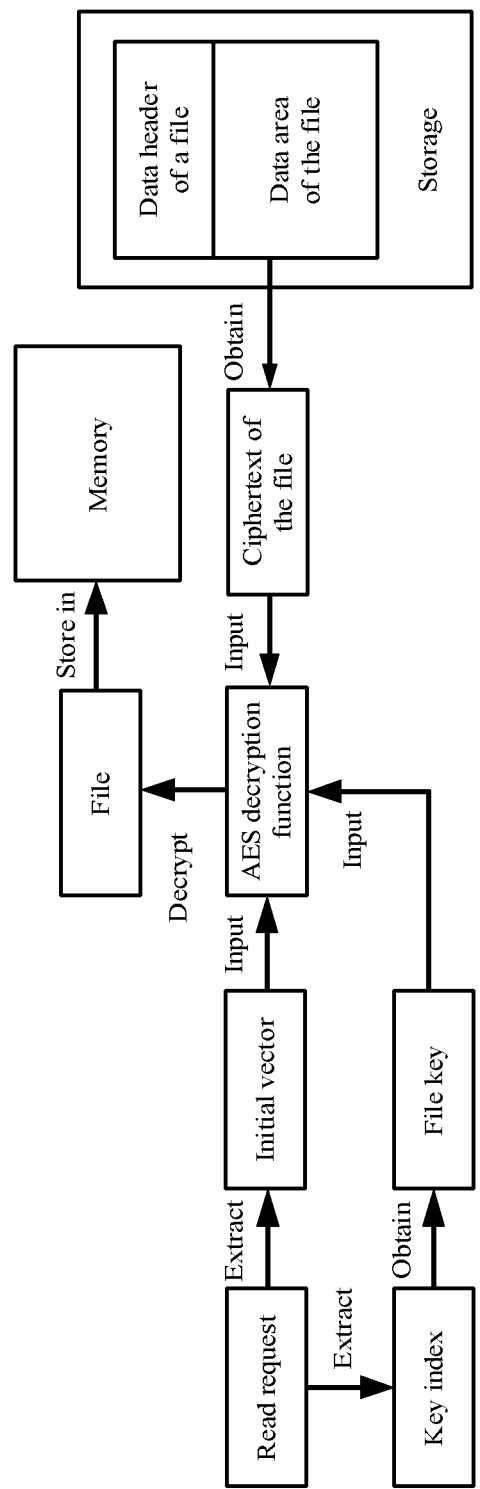
FIG. 4C is a schematic diagram of decrypting a file.

FIG. 4C is a schematic diagram of decrypting a file. With reference to FIG. 4A and FIG. 4C, first, the file encryption module 11 sends a read request to the encryption apparatus 311 in the storage controller 31. Then, the encryption apparatus 311 in the storage controller 31 obtains a key index and an initial vector from the read request. Then, the encryption apparatus 311 obtains a file key that corresponds to the key index and that is in the key register 312. Then, the encryption apparatus 311 uses a ciphertext of the file, the file key, and the initial vector as parameter inputs of an AES decryption function such that the AES decryption function outputs the file. And then, the encryption apparatus 311 stores the file in the memory 50. Finally, the third-party application software 12 or another module in the normal execution environment 10 reads the file in the memory 50.

Figure 5:
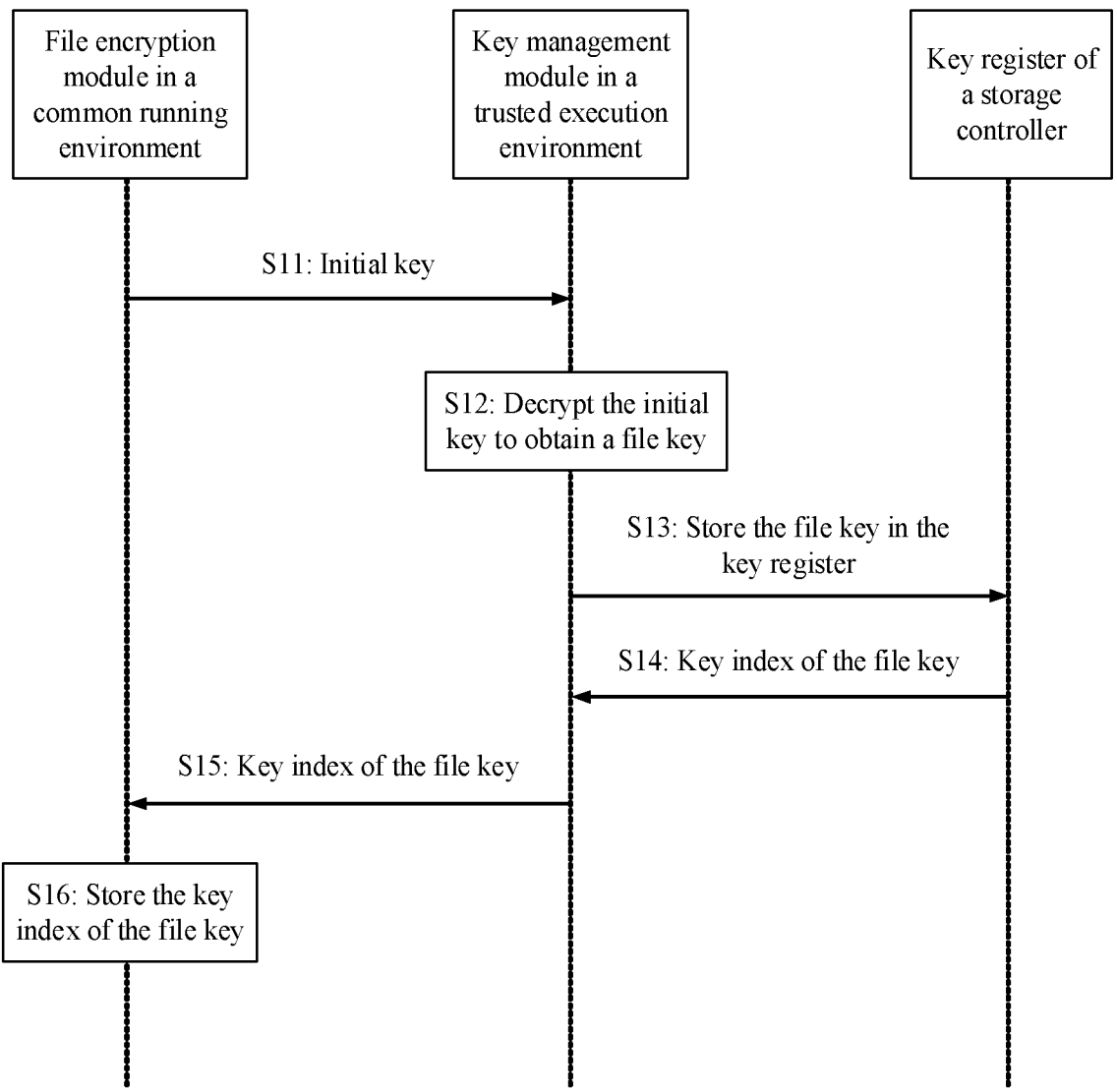
FIG. 5 is a signaling interaction diagram of a key processing method according to an embodiment of this application.

Refer to FIG. 2A and FIG. 5. FIG. 5 is a signaling interaction diagram of a key processing method according to an embodiment of this application. The intelligent device shown in FIG. 2A may perform the method shown in FIG. 5. The method shown in FIG. 5 can be used to ensure security of a process of generating a file key. The method includes the following steps.

Step S11: The file encryption module 11 in the normal execution environment 10 sends an initial key to the key management module 21 in the trusted execution environment 20. The initial key may be a pre-generated random number. For example, it is assumed that the initial key is 2068134157937.

Step S12: The key management module 21 in the trusted execution environment 20 decrypts the initial key to obtain a file key, where the file key is used to encrypt a file. That the key management module 21 decrypts the initial key to obtain a file key may include the following step. The key management module 21 in the trusted execution environment 20 decrypts the initial key using a first derivation key, to obtain the file key. In an implementable embodiment, before the key management module 21 in the trusted execution environment 20 decrypts the initial key using the first derivation key, to obtain the file key, the first derivation key needs to be first generated. The following briefly describes a specific manner of generating the first derivation key. The key management module 21 in the trusted execution environment 20 obtains a MAC of a PIN. The key management module 21 in the trusted execution environment 20 obtains a private key, where the private key may be a private symmetric key in the system on a chip 30, and the private key cannot be read by the file encryption module 11 in the normal execution environment 10. The key management module 21 in the trusted execution environment 20 obtains a first encryption factor, where the first encryption factor may be a pre-generated random number. The key management module 21 in the trusted execution environment 20 encrypts the MAC using the private key and the first encryption factor, to obtain the first derivation key.

In an implementable embodiment, before the key management module 21 in the trusted execution environment 20 decrypts the initial key using the first derivation key, to obtain the file key, the first derivation key needs to be first generated. The following briefly describes a specific manner of generating the first derivation key. The key management module 21 in the trusted execution environment 20 obtains a first encryption factor, where the first encryption factor may be a pre-generated random number. The key management module 21 in the trusted execution environment 20 obtains a private key, where the private key may be a private symmetric key in the system on a chip 30, and the private key cannot be read by the file encryption module 11 in the normal execution environment 10. The key management module 21 in the trusted execution environment 20 encrypts the first encryption factor using the private key, to obtain the first derivation key.

Step S13: The key management module 21 in the trusted execution environment 20 stores the file key in the key register 312 of the storage controller 31. The file encryption module 11 in the normal execution environment 10 is forbidden to access the key register 312 in the storage controller 31. In addition, the storage controller 31 may be an apparatus in the system on a chip 30.

Step S14: The key management module 21 in the trusted execution environment 20 obtains a key index of the file key in the key register 312. The key index is used to indicate a storage location of the file key in the key register 312. The storage controller 31 may obtain the file key in the key register 312 based on the key index.

Step S15: The key management module 21 in the trusted execution environment 20 sends the key index to the file encryption module 11 in the normal execution environment 10. Because the file encryption module 11 in the normal execution environment 10 is forbidden to access the key register 312 in the storage controller 31, the file encryption module 11 in the normal execution environment 10 cannot obtain the file key in the key register 312 based on the key index.

Step S16: The file encryption module 11 in the normal execution environment 10 stores the key index of the file key in the memory 50.

The file encryption module 11 stores the key index of the file key in the memory 50 for the following purpose. If the third-party application software 12 or another module in the normal execution environment 10 needs to write a file or if the third-party application software 12 or another module in the normal execution environment 10 needs to read a file, the file encryption module 11 may send the key index in the memory 50 to the storage controller 31 such that the storage controller 31 encrypts or decrypts the file. This implements a write operation or a read operation on the file.

In the embodiment shown in FIG. 5, the file encryption module 11 in the normal execution environment 10 is forbidden to access a module or information in the trusted execution environment 20. In a process in which the key management module 21 generates the file key, the file encryption module 11 in the normal execution environment 10 cannot steal the file key generated by the key management module 21. Therefore, the process of generating the file key is secure. In addition, after the key management module 21 generates the file key, the key management module 21 stores the file key in the key register 312 of the storage controller 31. Because the file encryption module 11 in the normal execution environment 10 is forbidden by the storage controller 31 to access the key register 312 of the storage controller 31, the file encryption module 11 in the normal execution environment 10 cannot steal the file key in the key register 312 of the storage controller 31. Therefore, the storage environment of the file key is also secure. In addition, the key management module 21 in the trusted execution environment 20 sends only the key index of the file key to the file encryption module 11 in the normal execution environment 10 such that when the third-party application software 12 or another module in the normal execution environment 10 needs to write a file or the third-party application software 12 or another module in the normal execution environment 10 needs to read a file, the file encryption module 11 may collaborate with the storage controller 31, the file encryption module 11 sends the key index to the storage controller 31, and the storage controller 31 encrypts or decrypts the file. This implements a write operation or a read operation on the file.

In an implementable embodiment, to ensure security of an initial vector, the key management module 21 in the trusted execution environment 20 may further decrypt the initial key to obtain a metadata key, where the metadata key is used to encrypt the initial vector, and the initial vector is used together with the file key to encrypt the file. The key management module 21 in the trusted execution environment 20 sends the metadata key to the file encryption module 11 in the normal execution environment 10.

In an implementable embodiment, that the key management module 21 in the trusted execution environment 20 decrypts the initial key to obtain a metadata key may include the following step. The key management module 21 in the trusted execution environment 20 decrypts the initial key using a second derivation key, to obtain the metadata key.

In an implementable embodiment, before the key management module 21 in the trusted execution environment 20 decrypts the initial key using the second derivation key, to obtain the metadata key, the second derivation key needs to be first generated. The following briefly describes a specific manner of generating the second derivation key. The key management module 21 in the trusted execution environment 20 obtains a MAC of a PIN. The key management module 21 in the trusted execution environment 20 obtains a private key, where the private key may be a private symmetric key in the system on a chip 30, and the private key cannot be read by the file encryption module 11 in the normal execution environment 10. The key management module 21 in the trusted execution environment 20 obtains a second encryption factor, where the second encryption factor may be a pre-generated random number. The key management module 21 in the trusted execution environment 20 encrypts the MAC using the private key and the second encryption factor, to obtain the second derivation key.

In an implementable embodiment, before the key management module 21 in the trusted execution environment 20 decrypts the initial key using the second derivation key, to obtain the metadata key, the second derivation key needs to be first generated. The following briefly describes a specific manner of generating the second derivation key. The key management module 21 in the trusted execution environment 20 obtains a second encryption factor, where the second encryption factor may be a pre-generated random number. The key management module 21 in the trusted execution environment 20 obtains a private key, where the private key may be a private symmetric key in the system on a chip 30, and the private key cannot be read by the file encryption module 11 in the normal execution environment 10. The key management module 21 in the trusted execution environment 20 encrypts the second encryption factor using the private key, to obtain the second derivation key.

Figure 6:
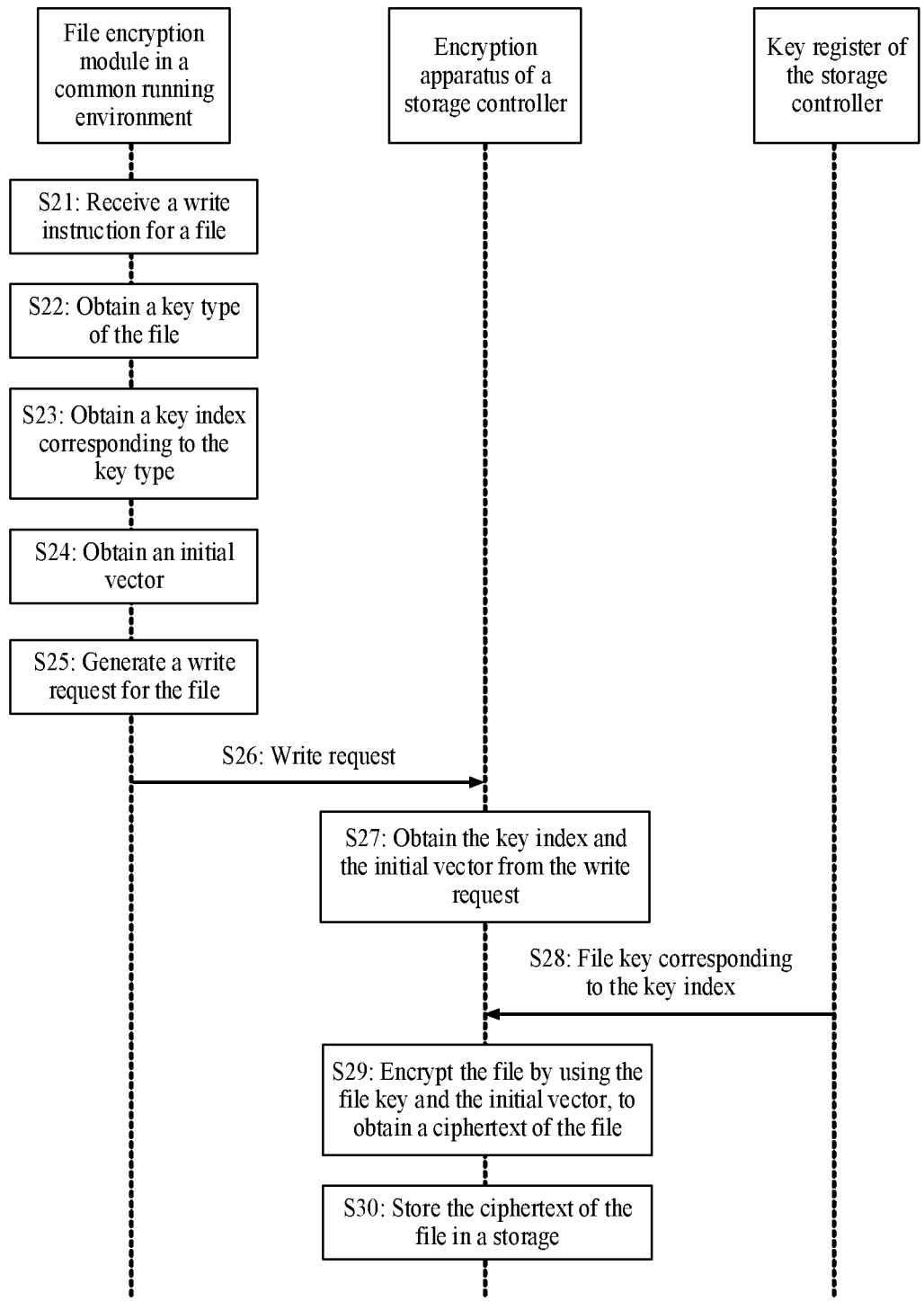
FIG. 6 is a signaling interaction diagram of a key processing method according to an embodiment of this application.

Refer to FIG. 3A and FIG. 6. FIG. 6 is a signaling interaction diagram of a key processing method according to an embodiment of this application. The intelligent device shown in FIG. 3A may perform the method shown in FIG. 6. The method shown in FIG. 6 can be used to ensure security of a file key in a process of writing a file. The method includes the following steps.

Step S21: The file encryption module 11 in the normal execution environment 10 receives a write instruction with respect to a file. The write instruction may be generated by the third-party application software 12 or another module in the normal execution environment 10.

Step S22: The file encryption module 11 in the normal execution environment 10 obtains a key type of the file. The file encryption module 11 presets a key type of each file. For example, a key type of a user file is A. For another example, a key type of a system file is B.

Step S23: The file encryption module 11 in the normal execution environment 10 obtains a key index corresponding to the key type. When the file encryption module 11 in the normal execution environment 10 receives the key index sent by the key management module 21 in the trusted execution environment 20, a mapping relationship between a key index and a key type is built. Therefore, the file encryption module 11 in the normal execution environment 10 may obtain, based on the mapping relationship between a key index and a key type, the key index corresponding to the key type.

Step S24: The file encryption module 11 in the normal execution environment 10 obtains an initial vector. Each time the file encryption module 11 in the normal execution environment 10 receives a write instruction with respect to a file, the file encryption module 11 generates a new initial vector, where the initial vector may be a random number.

Step S25: The file encryption module 11 in the normal execution environment 10 generates a write request with respect to the file based on the key index and the initial vector.

Step S26: The file encryption module 11 in the normal execution environment 10 sends the write request to the encryption apparatus 311 in the storage controller 31.

Step S27: The encryption apparatus 311 in the storage controller 31 obtains the key index and the initial vector from the write request.

Step S28: The encryption apparatus 311 in the storage controller 31 obtains a file key that corresponds to the key index and that is in the key register 312.

Step S29: The encryption apparatus 311 in the storage controller 31 encrypts the file using the file key and the initial vector, to obtain a ciphertext of the file.

Step S30: The encryption apparatus 311 in the storage controller 31 stores the ciphertext of the file in the storage 40.

In the embodiment shown in FIG. 6, because a module or software in the normal execution environment 10 is forbidden by the storage controller 31 to access the key register 312 in the storage controller 31, in the process of writing the file, the module or the software in the normal execution environment 10 cannot steal the file key stored in the key register 312, and the module or the software in the normal execution environment 10 cannot steal the file key used by the encryption apparatus 311 in a file encryption process. Therefore, in this embodiment of this application, security of the file key can be ensured in the process of writing the file.

In an implementable embodiment, to ensure security of the initial vector, the file encryption module 11 in the normal execution environment 10 may encrypt the initial vector using a metadata key, to obtain a ciphertext of the initial vector. The file encryption module 11 in the normal execution environment 10 stores the ciphertext of the initial vector in the storage 40.

Figure 7:
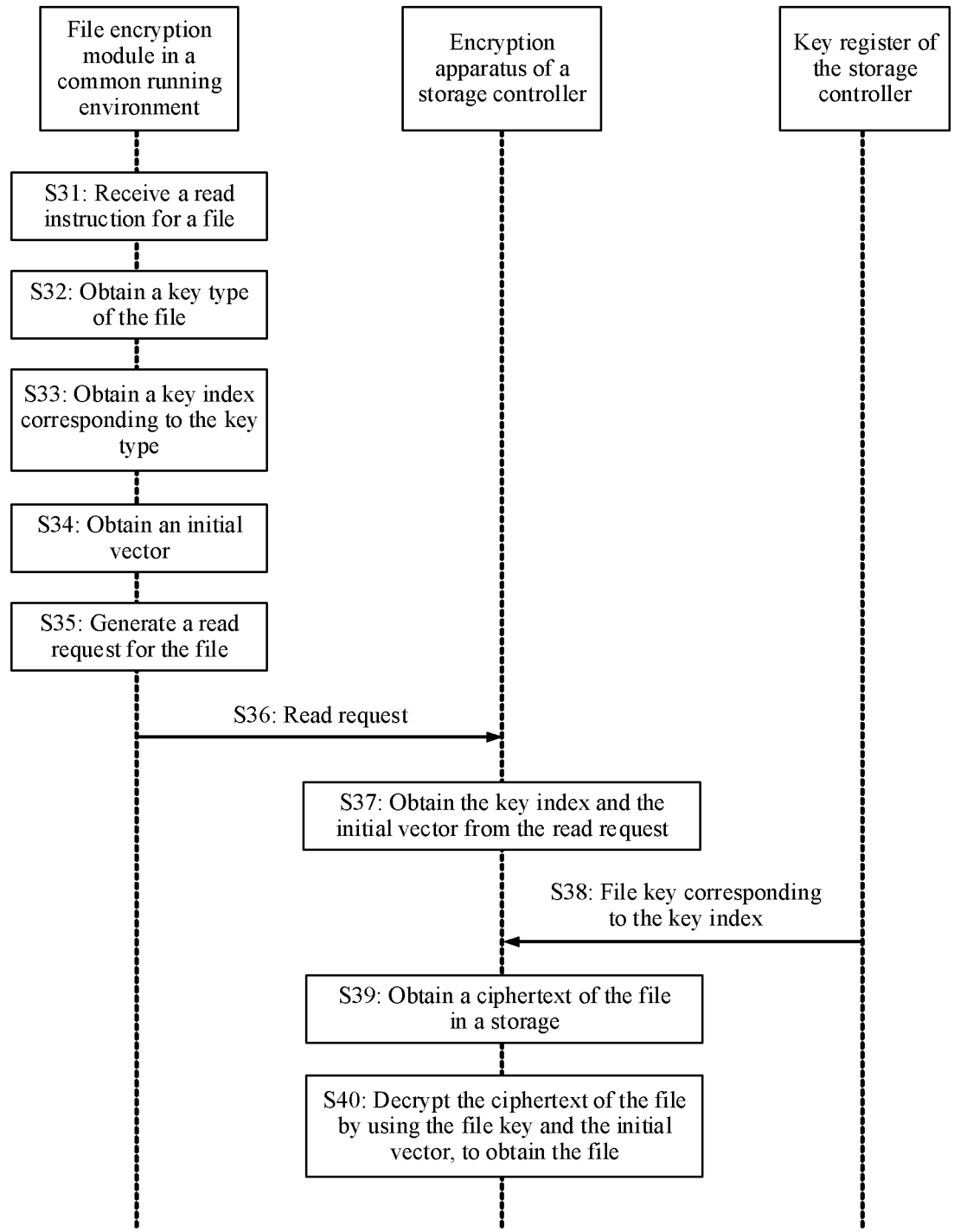
FIG. 7 is a signaling interaction diagram of a key processing method according to an embodiment of this application.

Refer to FIG. 4A and FIG. 7. FIG. 7 is a signaling interaction diagram of a key processing method according to an embodiment of this application. The intelligent device shown in FIG. 4A may perform the method shown in FIG. 7. The method shown in FIG. 7 can be used to ensure security of a file key in a process of reading a file. The method includes the following steps.

Step S31: The file encryption module 11 in the normal execution environment 10 receives a read instruction with respect to a file. The read instruction may be generated by the third-party application software 12 or another module in the normal execution environment 10.

Step S32: The file encryption module 11 in the normal execution environment 10 obtains a key type of the file. The file encryption module 11 presets a key type of each file. For example, a key type of a user file is A. For another example, a key type of a system file is B.

Step S33: The file encryption module 11 in the normal execution environment 10 obtains a key index corresponding to the key type. When the file encryption module 11 in the normal execution environment 10 receives the key index sent by the key management module 21 in the trusted execution environment 20, a mapping relationship between a key index and a key type is built. Therefore, the file encryption module 11 in the normal execution environment 10 may obtain, based on the mapping relationship between a key index and a key type, the key index corresponding to the key type.

Step S34: The file encryption module 11 in the normal execution environment 10 obtains an initial vector. Each time the file encryption module 11 in the normal execution environment 10 receives a write instruction with respect to a file, the file encryption module 11 generates a new initial vector, where the initial vector may be a random number.

Step S35: The file encryption module 11 in the normal execution environment 10 generates a read request with respect to the file based on the key index and the initial vector.

Step S36: The file encryption module 11 in the normal execution environment 10 sends the read request to the encryption apparatus 311 in the storage controller 31.

Step S37: The encryption apparatus 311 in the storage controller 31 obtains the key index and the initial vector from the read request.

Step S38: The encryption apparatus 311 in the storage controller 31 obtains the file key that corresponds to the key index and that is in the key register 312.

Step S39: The encryption apparatus 311 in the storage controller 31 obtains a ciphertext that is of the file and that is in the storage 40.

Step S40: The encryption apparatus 311 in the storage controller 31 decrypts the ciphertext of the file using the file key and the initial vector, to obtain the file.

In an implementable embodiment, because a module or software in the normal execution environment 10 is forbidden by the storage controller 31 to access the key register 312 in the storage controller 31, in the process of reading the file, the module or the software in the normal execution environment 10 cannot steal the file key stored in the key register 312, and the module or the software in the normal execution environment 10 cannot steal the file key used by the encryption apparatus 311 in a file decryption process. Therefore, in this embodiment of this application, security of the file key can be ensured in the process of reading the file.

In an implementable embodiment, if the file encryption module 11 in the normal execution environment 10 pre-encrypts the initial vector using a metadata key, to obtain a ciphertext of the initial vector, and stores the ciphertext of the initial vector in the storage 40, a specific process in which the file encryption module 11 in the normal execution environment 10 obtains the initial vector includes the following steps. The file encryption module 11 in the normal execution environment 10 obtains the ciphertext of the initial vector in the storage 40, the file encryption module 11 in the normal execution environment 10 obtains the metadata key, and the file encryption module 11 in the normal execution environment 10 decrypts the ciphertext of the initial vector using the metadata key, to obtain the initial vector.

Figure 8:
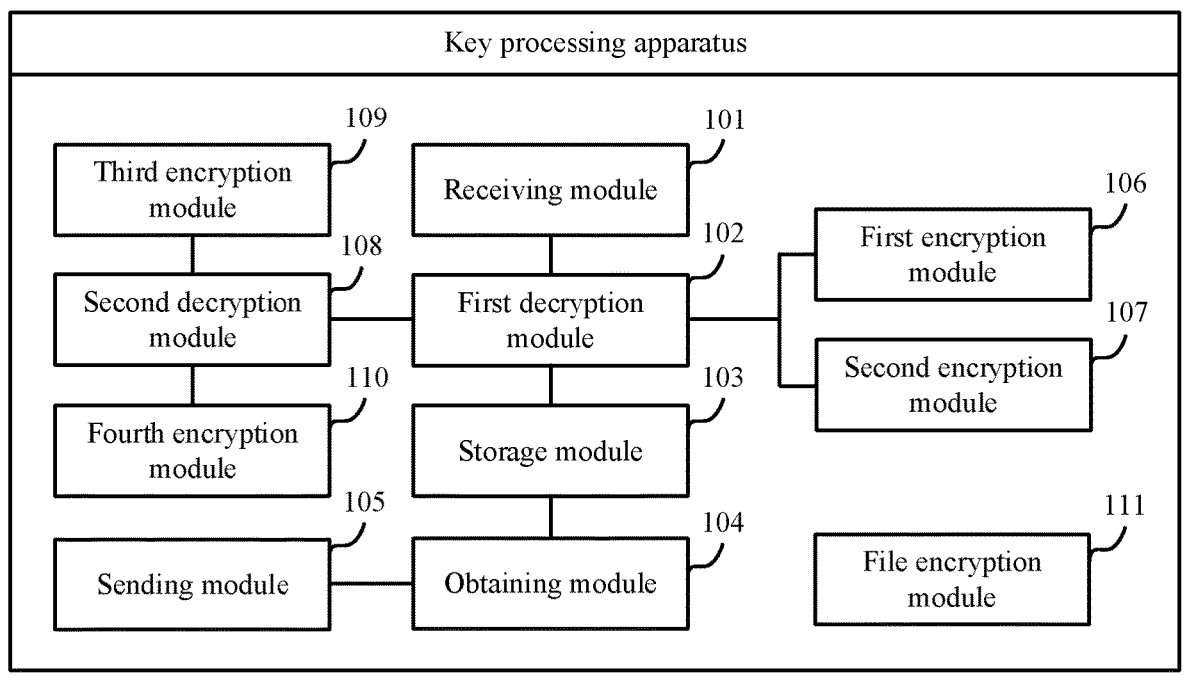
FIG. 8 is a schematic diagram of a key processing apparatus according to an embodiment of this application.

FIG. 8 is a schematic diagram of a key processing apparatus according to an embodiment of this application. The key processing apparatus includes the following modules.

A receiving module 101 is configured to receive, in a trusted execution environment, an initial key sent by a file encryption module in a normal execution environment. For a specific detailed implementation, refer to the detailed description of step S11 in the method embodiment shown in FIG. 5. With reference to FIG. 1, the receiving module 101 is located in the key management module 21 in FIG. 1.

A first decryption module 102 is configured to decrypt, in the trusted execution environment, the initial key to obtain a file key, where the file key is used to encrypt a file. For a specific detailed implementation, refer to the detailed description of step S12 in the method embodiment shown in FIG. 5. With reference to FIG. 1, the first decryption module 102 is located in the key management module 21 in FIG. 1.

A storage module 103 is configured to store, in the trusted execution environment, the file key in a key register of a storage controller, where the file encryption module in the normal execution environment is forbidden to access the key register of the storage controller. For a specific detailed implementation, refer to the detailed description of step S13 in the method embodiment shown in FIG. 5. With reference to FIG. 1, the storage module 103 is located in the key management module 21 in FIG. 1.

An obtaining module 104 is configured to obtain, in the trusted execution environment, a key index of the file key in the key register, where the key index is used to indicate a storage location of the file key in the key register. For a specific detailed implementation, refer to the detailed description of step S14 in the method embodiment shown in FIG. 5. With reference to FIG. 1, the obtaining module 104 is located in the key management module 21 in FIG. 1.

A sending module 105 is configured to send, in the trusted execution environment, the key index to the file encryption module in the normal execution environment. For a specific detailed implementation, refer to the detailed description of step S15 in the method embodiment shown in FIG. 5. With reference to FIG. 1, the sending module 105 is located in the key management module 21 in FIG. 1.

In an implementable embodiment, the first decryption module 102 is further configured to decrypt, in the trusted execution environment, the initial key using a first derivation key, to obtain the file key. For a specific detailed implementation, refer to the corresponding detailed description in the method embodiment shown in FIG. 5.

In an implementable embodiment, the key processing apparatus further includes a first encryption module 106. The first encryption module 106 is configured to obtain, in the trusted execution environment, a MAC of a PIN, obtain, in the trusted execution environment, a private key, obtain, in the trusted execution environment, a first encryption factor, and encrypt, in the trusted execution environment, the MAC using the private key and the first encryption factor, to obtain the first derivation key. For a specific detailed implementation, refer to the corresponding detailed description in the method embodiment shown in FIG. 5. With reference to FIG. 1, the first encryption module 106 is located in the key management module 21 in FIG. 1.

In an implementable embodiment, the key processing apparatus further includes a second encryption module 107. The second encryption module 107 is configured to obtain, in the trusted execution environment, a first encryption factor, obtain, in the trusted execution environment, a private key, and encrypt, in the trusted execution environment, the first encryption factor using the private key, to obtain the first derivation key. For a specific detailed implementation, refer to the corresponding detailed description in the method embodiment shown in FIG. 5. With reference to FIG. 1, the second encryption module 107 is located in the key management module 21 in FIG. 1.

In an implementable embodiment, the key processing apparatus further includes a second decryption module 108. The second decryption module 108 is configured to decrypt, in the trusted execution environment, the initial key to obtain a metadata key, where the metadata key is used to encrypt the initial vector, and the initial vector is used together with the file key to encrypt the file. The sending module 105 is further configured to send, in the trusted execution environment, the metadata key to the file encryption module in the normal execution environment. For a specific detailed implementation, refer to the corresponding detailed description in the method embodiment shown in FIG. 5. With reference to FIG. 1, the second decryption module 108 is located in the key management module 21 in FIG. 1.

In an implementable embodiment, the second decryption module 108 is further configured to decrypt, in the trusted execution environment, the initial key using a second derivation key, to obtain the metadata key. For a specific detailed implementation, refer to the corresponding detailed description in the method embodiment shown in FIG. 5.

In an implementable embodiment, the key processing apparatus further includes a third encryption module 109. The third encryption module 109 is configured to obtain, in the trusted execution environment, the MAC of the PIN, obtain, in the trusted execution environment, the private key, obtain, in the trusted execution environment, a second encryption factor, and encrypt, in the trusted execution environment, the MAC using the private key and the second encryption factor, to obtain the second derivation key. For a specific detailed implementation, refer to the corresponding detailed description in the method embodiment shown in FIG. 5. With reference to FIG. 1, the third encryption module 109 is located in the key management module 21 in FIG. 1.

In an implementable embodiment, the key processing apparatus further includes a fourth encryption module 110. The fourth encryption module 110 is configured to obtain, in the trusted execution environment, a second encryption factor, obtain, in the trusted execution environment, the private key, and encrypt, in the trusted execution environment, the second encryption factor using the private key, to obtain the second derivation key. For a specific detailed implementation, refer to the corresponding detailed description in the method embodiment shown in FIG. 5. With reference to FIG. 1, the fourth encryption module 110 is located in the key management module 21 in FIG. 1.

In an implementable embodiment, the key processing apparatus further includes a file encryption module 111. The file encryption module 111 is configured to receive, in the normal execution environment, a processing instruction with respect to a file, obtain, in the normal execution environment, a key type of the file, obtain, in the normal execution environment, a key index corresponding to the key type, obtain, in the normal execution environment, an initial vector, generate, in the normal execution environment, a processing request with respect to the file based on the key index and the initial vector, and send, in the normal execution environment, the processing request to the storage controller. For a specific detailed implementation, refer to the detailed descriptions of step S21 to step S26 in the method embodiment shown in FIG. 6, and refer to the detailed descriptions of step S31 to step S36 in the method embodiment shown in FIG. 7. With reference to FIG. 1, the file encryption module 111 is equivalent to the file encryption module 11 in FIG. 1.

In an implementable embodiment, the file encryption module 111 is further configured to encrypt, in the normal execution environment, the initial vector using a metadata key, to obtain a ciphertext of the initial vector, and store, in the normal execution environment, the ciphertext of the initial vector in a storage. For a specific detailed implementation, refer to the corresponding detailed description in the method embodiment shown in FIG. 6 or FIG. 7.

In an implementable embodiment, the file encryption module 111 is further configured to obtain, in the normal execution environment, a ciphertext of the initial vector in a storage, obtain, in the normal execution environment, a metadata key, and decrypt, in the normal execution environment, the ciphertext of the initial vector using the metadata key, to obtain the initial vector. For a specific detailed implementation, refer to the corresponding detailed description in the method embodiment shown in FIG. 6 or FIG. 7.

It should be understood that, in the foregoing embodiment corresponding to FIG. 8, each module is implemented in a form of software. For example, referring to FIG. 1, the file encryption module 11, the key management module 21, the third-party application software 12, and the password authentication module 22 all exist in a form of software modules. However, in actual application, one or more of the modules may be implemented by hardware. In a specific embodiment, whether a function of each module is implemented by software or hardware may be freely selected by a designer.

It should be noted that, when a function implemented by software is related in the foregoing embodiments, related software or a module in the software may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible by a computer. The following provides an example but does not impose a limitation. The computer-readable medium may include a RAM, a read-only memory (ROM), an electrically erasable programmable ROM (EEPROM), a compact disc (CD) ROM (CD-ROM) or another compact disc storage, a magnetic disk storage medium or another magnetic storage device, or any other medium that can carry or store expected program code in a form of an instruction or a data structure and is accessible by a computer. In addition, any connection may be appropriately defined as a computer-readable medium. For example, if the software is transmitted from a website, a server, or another remote source through a coaxial cable, an optical fiber/cable, a twisted pair, a digital subscriber line (DSL), or wireless technologies such as infrared ray, radio, and microwave, the coaxial cable, optical fiber/cable, twisted pair, DSL, or the wireless technologies such as infrared ray, radio, and microwave are included in the definition of a medium to which they belong. A disk and a disc used in this application include a CD, a laser disc, an optical disc, a digital versatile disc (DVD), a floppy disk, and a BLU-RAY DISC. The disk usually copies data in a magnetic manner, but the disc copies data optically through a laser. The foregoing combination should also be included in the protection scope of the computer-readable medium.

It should be understood that related software or a module in the software may be executed by the processor 32 shown in FIG. 1, to implement a method procedure corresponding to the foregoing embodiment. The foregoing embodiments are merely intended to describe the technical solutions in this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

The invention claimed is:
1. A key processing method comprising:
receiving, in a trusted execution environment, an initial key from a file encryption system in a normal execution environment, wherein the initial key is encrypted;
decrypting, in the trusted execution environment, the initial key using a first derivation key to obtain a file key that is configured to encrypt a file;

storing, in the trusted execution environment, the file key in a key register of a storage controller, wherein the file encryption system is forbidden to access the key register;

obtaining, in the trusted execution environment, a key index of the file key in the key register, wherein the key index indicates a storage location of the file key in the key register; and sending, in the trusted execution environment, the key index to the file encryption system, wherein before decrypting the initial key using the first derivation key, the key processing method further comprises:

obtaining, in the trusted execution environment, a message authentication code (MAC) of a personal identification number (PIN);

obtaining, in the trusted execution environment, a private key;

obtaining, in the trusted execution environment, a first encryption factor; and encrypting, in the trusted execution environment, the MAC using the private key and the first encryption factor to obtain the first derivation key.

2. The key processing method of claim 1, wherein before decrypting the initial key using the first derivation key, the key processing method further comprises:

encrypting, in the trusted execution environment, the first encryption factor using the private key to obtain the first derivation key.

3. The key processing method of claim 1, wherein after sending the key index, the key processing method further comprises:

receiving, by the file encryption system, a processing instruction with respect to the file;

obtaining, by the file encryption system, a key type of the file in response to the processing instruction;

obtaining, by the file encryption system, the key index corresponding to the key type;

obtaining, by the file encryption system, an initial vector, wherein the initial vector is used together with the file key to encrypt the file;

generating, by the file encryption system, a processing request with respect to the file based on the key index and the initial vector; and sending, by the file encryption system, the processing request to the storage controller.

4. A key processing apparatus comprising:
a storage controller comprising a key register;
an interface coupled to the storage controller; and
a processor coupled to the interface and configured to:
generate a trusted execution environment and a normal execution environment;
implement functions of a file encryption system in the normal execution environment;
receive, in the trusted execution environment, an initial key from the file encryption system, wherein the initial key is encrypted;
decrypt, in the trusted execution environment, the initial key using a first derivation key to obtain a file key that is configured to encrypt a file;
store, in the trusted execution environment, the file key in the key register through the interface, wherein the file encryption system in the normal execution environment is forbidden to access the key register;
obtain, in the trusted execution environment, a key index of the file key in the key register through the interface, wherein the key index indicates a storage location of the file key in the key register; and
send, in the trusted execution environment, the key index to the file encryption system, and
wherein, before the initial key is decrypted using the first derivation key, the processor is further configured to:
obtain, in the trusted execution environment, a message authentication code (MAC) of a personal identification number (PIN);
obtain, in the trusted execution environment, a private key;
obtain, in the trusted execution environment, a first encryption factor; and
encrypt, in the trusted execution environment, the MAC using the private key and the first encryption factor to obtain the first derivation key.

5. The key processing apparatus of claim 4, wherein the processor is further configured to:
encrypt, in the trusted execution environment, the first encryption factor using the private key to obtain the first derivation key.

6. The key processing apparatus of claim 4, wherein the processor is further configured to implement, in the normal execution environment, the following functions of the file encryption system:
receive a processing instruction with respect to the file;
obtain a key type of the file;
obtain the key index corresponding to the key type;
obtain an initial vector, wherein the initial vector is used together with the file key to encrypt the file;
generate a processing request with respect to the file based on the key index and the initial vector; and
send the processing request to the storage controller.

7. The key processing apparatus of claim 6, wherein the storage controller further comprises an encryption apparatus configured to:
receive the processing request from the file encryption system;
obtain the file key corresponding to the key index that is in the key register; and
further configured to either:
encrypt the file using the file key and the initial vector to obtain a ciphertext of the file, and store the ciphertext of the file in a storage; or
obtain the ciphertext from the storage, and decrypt the ciphertext using the file key and the initial vector to obtain the file.

8. The key processing apparatus of claim 6, wherein the processor is further configured to implement, in the normal execution environment, the following functions of the file encryption system:
obtain a metadata key;
encrypt the initial vector using the metadata key to obtain a ciphertext of the initial vector; and
store the ciphertext in a storage.

9. The key processing apparatus of claim 6, wherein the processor is further configured to implement, in the normal execution environment, the following functions of the file encryption system:
obtain a ciphertext of the initial vector in a storage;
obtain a metadata key; and
decrypt the ciphertext using the metadata key to obtain the initial vector.

10. The key processing apparatus of claim 9, wherein the processor is further configured to:

decrypt, in the trusted execution environment, the initial key to obtain the metadata key; and send, in the trusted execution environment, the metadata key to the file encryption system.

11. The key processing apparatus of claim 10, wherein the processor is further configured to decrypt, in the trusted execution environment, the initial key using a second derivation key to obtain the metadata key.

12. The key processing apparatus of claim 11, wherein the processor is further configured to:
- obtain, in the trusted execution environment, a second encryption factor; and
- encrypt, in the trusted execution environment, the MAC using the private key and the second encryption factor to obtain the second derivation key.

13. The key processing apparatus of claim 11, wherein the processor is further configured to:
- obtain, in the trusted execution environment, a second encryption factor; and
- encrypt, in the trusted execution environment, the second encryption factor using the private key to obtain the second derivation key.

* * * * *